(12) United States Patent
Ishimoto et al.

(10) Patent No.: US 8,363,522 B2
(45) Date of Patent: Jan. 29, 2013

(54) RECORDING DEVICE AND RECORDING METHOD

(75) Inventors: Tsutomu Ishimoto, Tokyo (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/151,768

(22) Filed: Jun. 2, 2011

(65) Prior Publication Data

US 2011/0305127 A1 Dec. 15, 2011

(30) Foreign Application Priority Data

Jun. 10, 2010 (JP) ................................. 2010-132743

(51) Int. Cl.
*G11B 20/00* (2006.01)
(52) U.S. Cl. ...................................................... 369/47.15
(58) Field of Classification Search ........................ None
See application file for complete search history.

(56) References Cited

U.S. PATENT DOCUMENTS

| 6,201,784 | B1 * | 3/2001 | Maeda ........................ 369/59.25 |
| 6,459,666 | B1 | 10/2002 | Yokoi |
| 6,771,577 | B2 | 8/2004 | Yokoi |
| 2008/0186840 | A1 | 8/2008 | Uchiyama et al. |
| 2008/0205257 | A1 | 8/2008 | Yamatsu et al. |

FOREIGN PATENT DOCUMENTS

| JP | 2001-118245 A | 4/2001 |
| JP | 2008-135144 A | 6/2008 |
| JP | 2008-176902 A | 7/2008 |

* cited by examiner

*Primary Examiner* — Joseph Feild
*Assistant Examiner* — Parul Gupta
(74) *Attorney, Agent, or Firm* — Wolf, Greenfield & Sacks, P.C.

(57) ABSTRACT

A recording device includes: a rotation driving unit that rotates an optical medium having a reference face and a recording layer, at a constant velocity; a light irradiating unit that irradiates the optical recording medium with first and second light through a common object lens; an infocus position adjusting unit that performs adjustment to focus; a light receiving unit that receives reflection light from the reference face; a reproducing clock generating unit that generates a reproducing clock on the basis of a light reception signal; a radial position detecting unit that detects the radial positional information on the basis of the light reception signal and the reproducing clock positional information; a frequency adjusting unit that changes a frequency of an input reference signal; and a recording unit that performs mark recording on the recording layer using the signal obtained by the frequency adjusting unit as a recording clock.

18 Claims, 22 Drawing Sheets

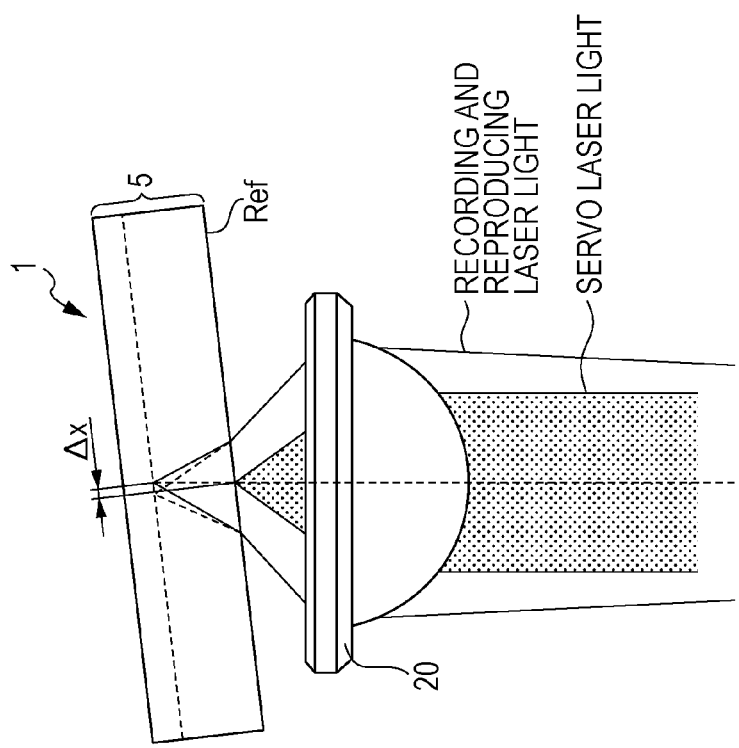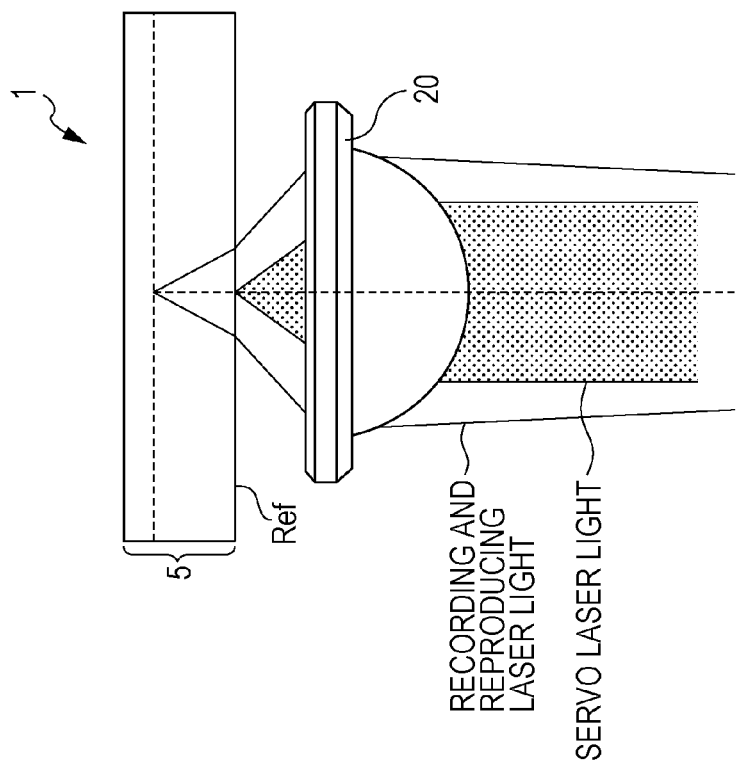

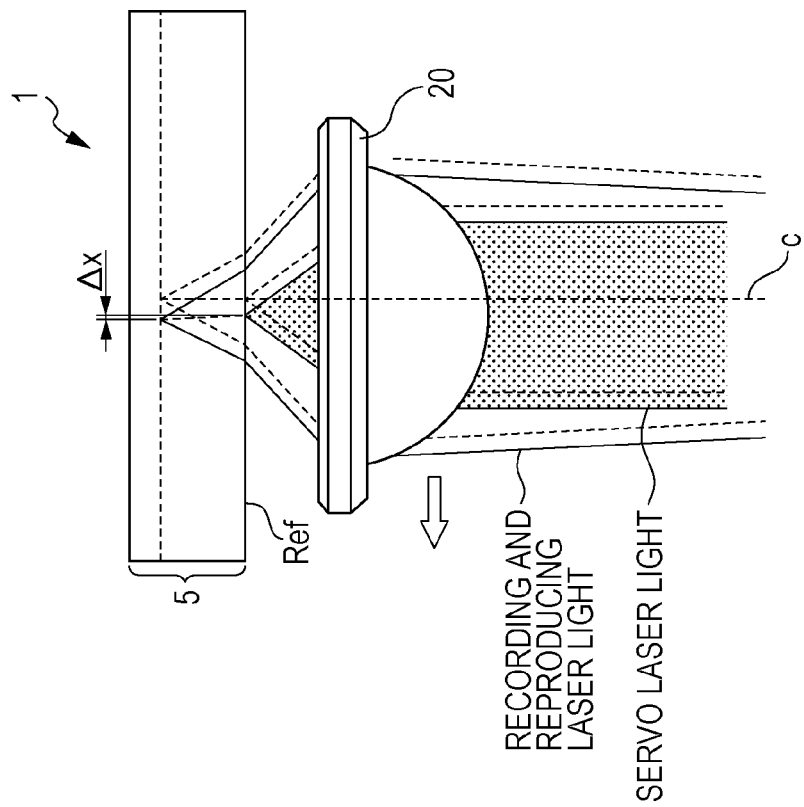
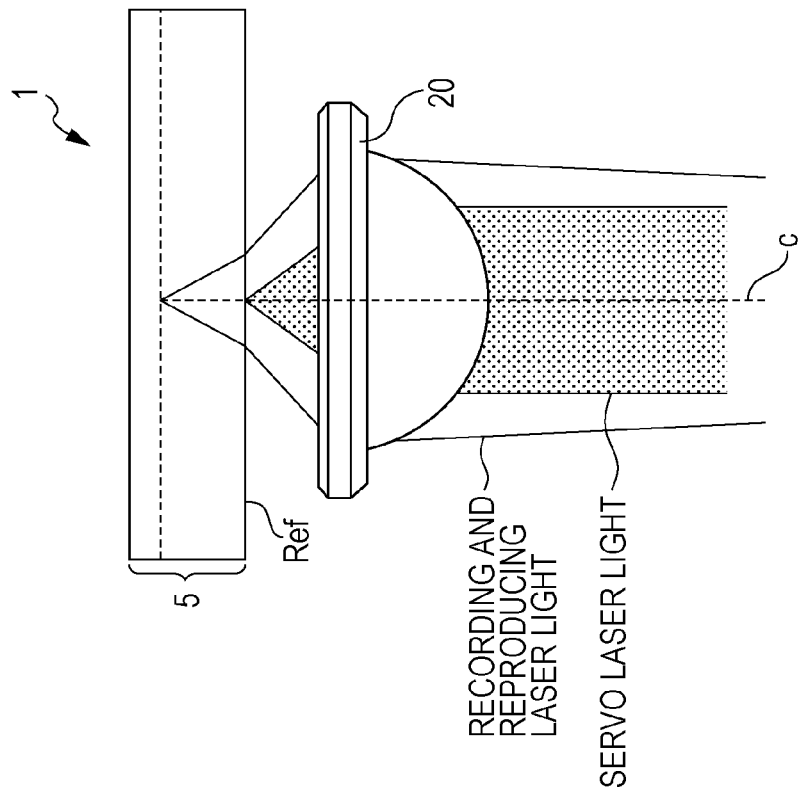

FIG. 7A

| PIT ROW A | * | — | — | — | — | — | — | — | — | — | — | — | — |
| PIT ROW B | — | * | — | — | — | — | — | — | — | — | — | — | — |
| PIT ROW C | — | — | * | — | — | — | — | — | — | — | — | — | — |
| PIT ROW D | — | — | — | * | — | — | — | — | — | — | — | — | — |
| PIT ROW E | — | — | — | — | * | — | — | — | — | — | — | * | — |
| PIT ROW F | — | — | — | — | — | * | — | — | — | — | — | — | * |

* ON EACH PIT ROW IS 1ch bit

FIG. 7B

4ch bit = 1011 = Data bit "0"
4ch bit = 1101 = Data bit "1"

FIG. 7C

12ch bit = 1111 | 1111 | 1011 | = Sync1
12ch bit = 1111 | 1111 | 1101 | = Sync2

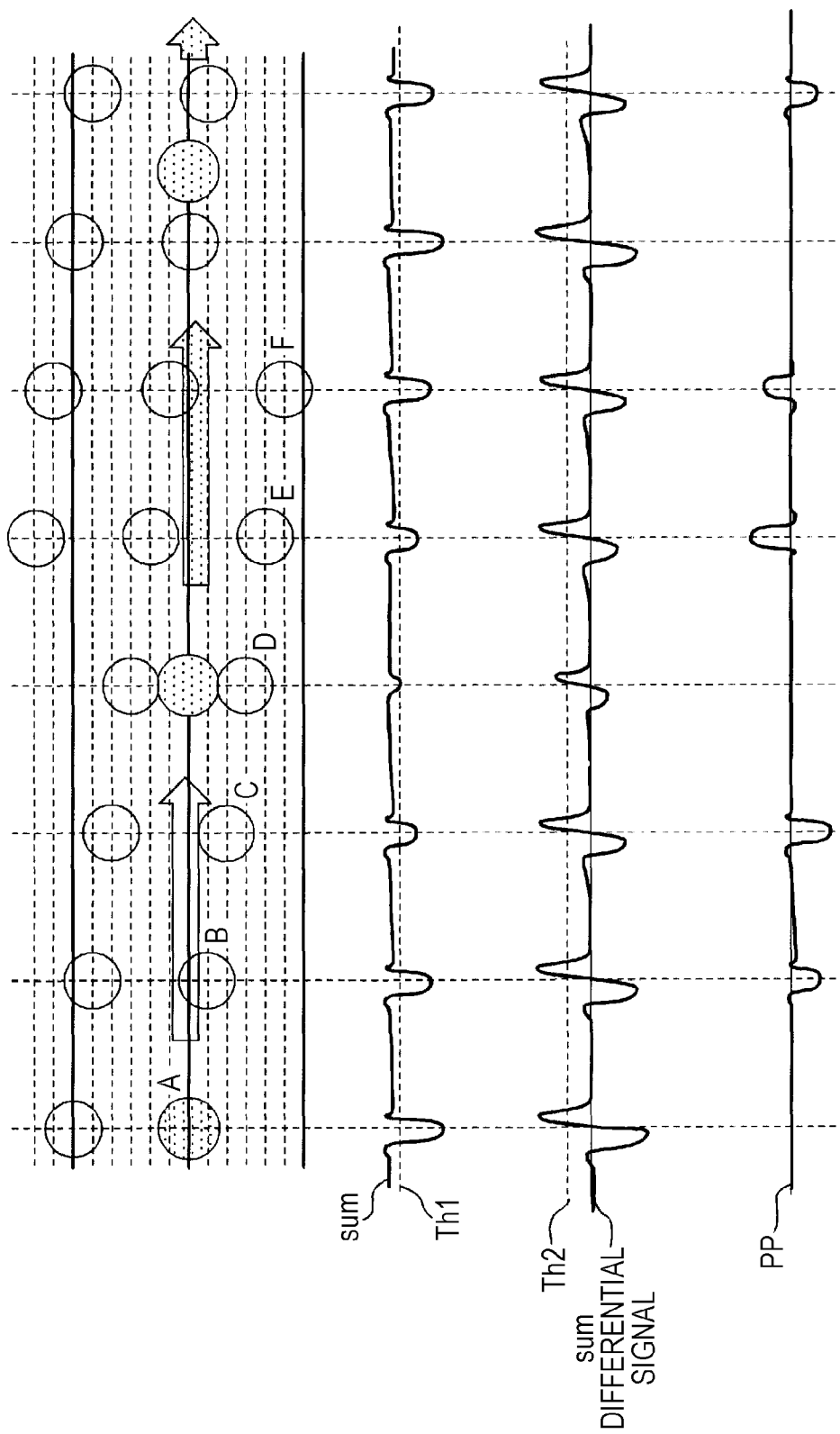

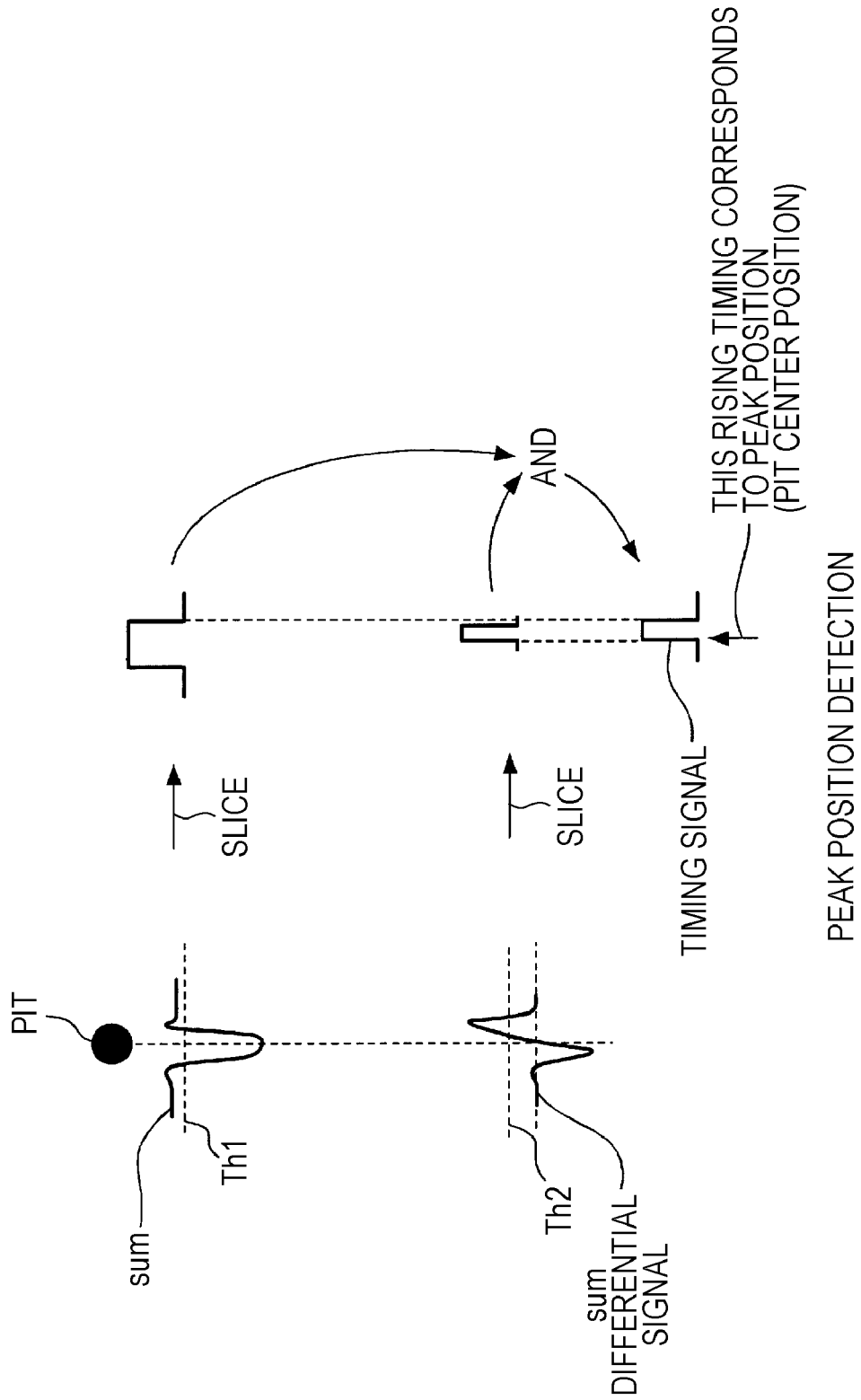

RECORDING DEVICE AND RECORDING METHOD

BACKGROUND

The present disclosure relates to a recording device performing at least recording on an optical recording medium including a reference face on which information recording including radial positional information is performed in a CAV (Constant Angular Velocity) manner, and a recording layer formed at a depth position different from the reference face, and a method thereof.

As an optical recording medium for the recording and reproducing of signals through the irradiation of light, so-called optical discs such as CDs (Compact Discs), DVDs (Digital Versatile Discs), and BDs (Blu-ray Discs: Registered Trademark) have come into use.

Concerning an optical recording medium taking a major role in the next generation of the optical mediums relating to the currently widespread CD, DVD, and BD, and the like, the applicant proposes a so-called bulk recording type (merely, also referred to as a bulk type) optical recording medium described in Japanese Unexamined Patent Application Publication Nos. 2008-135144 and 2008-176902.

For example, as shown in FIG. 21, bulk recording is for performing multilayer recording in a bulk layer 102 by performing laser beam irradiation while sequentially changing the infocus position, which is a technique for achieving high capacity recording, and relates to an optical recording medium (a bulk type recording medium 100) having at least a cover layer 101 and a bulk layer (a recording layer) 102.

Concerning such bulk recording, in Japanese Unexamined Patent Application Publication No. 2008-135144, a recording technique which is a so-called micro-hologram method is disclosed. In the micro-hologram method, a so-called hologram recording material is used as the recording material of the bulk layer 102. As the hologram recording material, a photopolymerization-type photopolymer and the like are widely known.

The micro-hologram method is broadly divided into two methods of a positive type micro-hologram method and a negative type micro-hologram method.

The positive type micro-hologram method is a method of condensing two opposed light fluxes (light flux A and light flux B) at the same position and forming a micro-interference pattern (hologram) to use the interference pattern as a recording mark.

As a concept opposite to the positive type micro-hologram method, the negative type micro-hologram method is a method of erasing a previously formed interference pattern through irradiation of laser light to use the erased portion as a recording mark. In the negative micro-hologram method, a process of forming an interference pattern on a bulk layer in advance is necessary as an initialization process.

As a method of bulk recording different from the micro-hologram method, the applicant also proposes, for example, a recording method of forming a void (vacancy or blank) disclosed in Japanese Unexamined Patent Application Publication No. 2008-176902, as a recording mark.

The void recording method is a method of performing laser irradiation with relatively high power on the bulk layer 102 formed of a recording material such as photopolymerization type photopolymer, to record a void in the bulk layer 102. As described in Japanese Unexamined Patent Application Publication No. 2008-176902, the vacancy portion formed as described above has a refractive index different from that of the other portion in the bulk layer 102, and it is possible to raise the reflectance of light at such a boundary portion. Accordingly, the vacancy portion serves as a recording mark, and thus information recording based on the forming of the vacancy mark is realized.

Since such a void recording method is not for forming the hologram, the irradiation of light from one side may be performed in the recording. That is, it is not necessary to condense two light fluxes at the same position to form the recording mark in the same manner as the positive type micro-hologram method.

In comparison with the negative micro-hologram method, there is merit in that the initialization process may not be necessary.

In Japanese Unexamined Patent Application Publication No. 2008-176902, an example of performing irradiation of pre-cured light before recording when performing the void recording is described. However, even when the irradiation of such pre-cured light is omitted, the recording of a void is possible.

Although it is a bulk recording type (simply referred to as bulk type) optical recording medium for which various recording methods are proposed as described above, the recording layer (bulk layer) of such a bulk type optical recording medium does not have an evincive multilayer structure, for example, meaning one in which a plurality of reflection films are formed. That is, in the bulk layer 102, a reflection film and a guiding groove for each recording layer, which is provided in a general multilayer disc, are not provided.

Accordingly, in the state of the structure of the bulk type recording medium 100 itself shown in FIG. 21, focus servo or tracking servo may not be performed at the time of recording in which the mark is not formed.

For this reason, in practice, the bulk type recording medium 100 is provided with a referential reflection face (reference face) having guiding grooves as shown in FIG. 22.

Specifically, guiding grooves (position guides) are formed in a spiral shape or concentric shape, for example, by forming pits or grooves on the lower face side of the cover layer 101, and a selective reflection film 103 is formed thereon. On the lower layer side of the cover layer 102 on which the selective reflection film 103 is formed as described above, a bulk layer 102 is laminated as an intermediate layer 104 in the drawing through an adhesive material such as UV curable resin.

By forming the guiding grooves using the pits or grooves as described above, absolute positional information (address information) such as radial positional information and rotation angle information is recorded. In the following description, a face on which such guiding grooves are formed and the absolute positional information is recorded (in this case, the forming face of the selective reflection film 103) is called "reference face Ref".

After forming the medium structure as described above, in the bulk type recording medium 100, as shown in FIG. 23, servo laser light (merely referred to as servo light) as laser light for positional control is irradiated, separately from laser light (hereinafter, referred to as recording and reproducing laser light, or merely recording and reproducing light) for recording (or reproducing) a mark.

As shown, the bulk type recording medium 100 is irradiated with the recording and reproducing laser light and the servo laser light through a common object lens.

In this case, if the servo laser light reaches the bulk layer 102, there may be an adverse effect on the mark recording in the bulk layer 102. For this reason, in the bulk recording method of the related art, laser light having a wavelength band different from that of the recording and reproducing laser light is used as the servo laser light, and the selective reflection film 103 having wavelength selectivity in which the servo laser light is reflected and the recording and reproducing laser light passes is provided as a reflection film formed on the reference face Ref.

Under the presupposition of the above-description, an operation at the mark recording time on the bulk type recording medium 100 will be described with reference to FIG. 23.

First, when multilayer recording is performed on the bulk layer 102 on which the guiding groove or the reflection film is not formed, it is predetermined where the layer position for recording the mark in the depth direction in the bulk layer 102. In the drawing, as the layer position (mark forming layer position: also referred to as the information recording layer position) for forming the mark in the bulk layer 102, a case of setting a total of five information recording layer positions L of a first information recording layer position L1 to a fifth information recording layer position L5 is exemplified. As shown, the first information recording layer position L1 is set as a position separated from the selective reflection film 103 (reference face Ref) on which the guiding grooves are formed in a focus direction (depth direction) by a first offset of-L1. The second information recording layer position L2, the third information recording layer position L3, the fourth information recording layer position L4, and the fifth information recording layer position L5 are set as positions separated from the reference face Ref by a second offset of-L2, a third offset of-L3, a fourth offset of-L4, and a fifth offset of-L5, respectively.

During recording when the mark is not formed yet, the focus servo and the tracking servo on each layer position in the bulk layer 102 based on the reflection light of the recording and reproducing laser light may not be performed. Accordingly, focus servo control and tracking servo control of the object lens during recording are performed such that a spot position of the servo laser light follows the guiding grooves with respect to the reference face Ref on the basis of the reflection light of the servo laser light.

However, the recording and reproducing laser light should reach the bulk layer 102 formed further to the lower side than the reference face Ref to record a mark. For this reason, in the optical system in this case, a recording and reproducing light focus mechanism for independently adjusting the infocus position of the recording and reproducing laser light is provided separately from the focus mechanism of the object lens.

Specifically, such a focus mechanism is provided with an expander changing collimation of recording and reproducing laser light input to the object lens. That is, by changing the collimation of the recording and reproducing laser light input to the object lens, the infocus position of the recording and reproducing laser light can be adjusted independently from the servo laser light.

By providing the focus mechanism for such a recording and reproducing laser light, the infocus position of the recording and reproducing laser light can be adjusted at a necessary information recording layer position L in the bulk layer 102 and can be controlled at a position just under a guiding groove formed on the reference face Ref, by performing the focus control of the object lens and the tracking servo control on the basis of the reflection light of the servo laser light from the reference face Ref.

When the recording is performed on the bulk type recording medium 100 on which the mark recording has already been performed, in the same manner as during recording it is not necessary to control the position of the object lens on the basis of the reflection light of the servo laser light. That is, during reproducing, the focusing of the object lens and the tracking servo control may be performed on the mark rows formed at the information recording layer position L (also referred to as an information recording layer L during reproduction) that is the reproduction target on the basis of the reflection light of the recording and reproducing laser light.

An example of the related art is disclosed in Japanese Unexamined Patent Application Publication No. 2001-118245.

As described above, at the time of recording on the bulk type recording medium 100, the mark row is recorded at a desired position in the bulk layer 102 by infocusing the recording and reproducing laser light at the necessary information recording layer position L in the bulk layer 5 while performing the focus servo and the tracking servo on the reference face Ref by the servo laser light.

Information such as absolute value positional information is recorded on the reference face Ref by forming the position guide based on, for example, pit rows (mark rows) or grooves, as described above. However, it is thought that the information recording is performed on the reference face Ref not by a CLV (Constant Linear Velocity) method but by a CAV (Constant Angular Velocity) method.

When the information recording on the reference face Ref is performed by the CAV method as described above, it follows that, the bulk type recording medium 100 is rotated by CAV (rotation at constant velocity). When the bulk type recording medium 100 is rotated by CAV as described above, the mark recording on the bulk layer 102 is also performed by the CAV method.

However, as is commonly known, the recording based on the CAV method causes a decrease in recording density as compared with the recording based on the CLV method. For this reason, it is difficult to avoid a decrease in recording capacity of the bulk layer 102.

SUMMARY

It is desirable to improve the recording density of the mark on the recording layer and to increase the recording capacity of the recording layer, with respect to the optical recording medium including a reference face on which information is recorded by the CAV method, and a recording layer provided at a depth position different from the reference face.

According to an embodiment of the disclosure, a recording device is configured as follows.

The recording device includes a rotation driving unit that rotates an optical medium having a reference face on which information including radial positional information is recorded by a CAV method (Constant Angular Velocity) and a recording layer formed at a depth position different from the reference face, at a constant velocity.

The recording device includes a light irradiating unit that irradiates the optical recording medium with first light to be irradiated onto the recording layer and second light to be irradiated onto the reference face through a common object lens.

The recording device includes an infocus position adjusting unit that performs adjustment to focus the first light at a necessary position in the recording layer with the second light focused on the reference face.

The recording device includes a light receiving unit that receives reflection light of the second light from the reference face.

The recording device includes a reproducing clock generating unit that generates a reproducing clock on the basis of a light reception signal obtained by the light receiving unit.

The recording device includes a radial position detecting unit that detects the radial positional information recorded on the reference face on the basis of the light reception signal obtained by the light receiving unit and the reproducing clock.

The recording device includes a frequency adjusting unit that changes the frequency of an input reference signal according to the radial positional information detected by the radial position detecting unit.

The recording device includes a recording unit that performs mark recording on the recording layer by driving a light source of the first light to emit light using the signal obtained by the frequency adjusting unit as a recording clock.

In the present disclosure, it is assumed that the optical recording medium having the reference face on which the information including the radial positional information is CAV recorded and the recording layer is rotated at a constant velocity to perform the mark recording on the recording layer. In the present disclosure, under the assumption, the mark recording is performed on the recording layer on the basis of the recording clock generated by changing the frequency of the reference signal according to the radial positional information recorded on the reference face.

As described above, by performing the mark recording on the basis of the recording clock generated by changing the frequency according to the radial positional information, it is possible to improve the mark recording density for the recording layer, as compared with a case of merely performing the CAV recording on the recording layer according to the rotation of the optical recording medium at the constant velocity.

According to the present disclosure, under the assumption that the optical recording medium having the reference face on which the information including the radial positional information is CAV recorded and the recording layer is rotated at the constant velocity, the mark recording on the recording layer is performed on the basis of the recording clock generated by changing the frequency according to the radial positional information, and thus it is possible to improve the recording density of the mark on the recording layer.

As a result, it is possible to increase the recording capacity of the recording layer.

BRIEF DESCRIPTION OF THE DRAWINGS

FIG. 3A and FIG. 3B are diagrams schematically illustrating a spot position deviation between recording and reproducing laser light and servo laser light caused by skew.

FIG. 4A and FIG. 4B are diagrams schematically illustrating a spot position deviation between recording and reproducing laser light and servo laser light caused by lens shift.

FIG. 7A, FIG. 7B, and FIG. 7C are diagrams illustrating an address information format.

FIG. 8 is a diagram schematically illustrating the movement of a spot of servo laser light on the reference face due to the rotation of the bulk type recording medium, and relationship of the waveforms of a sum signal, a sum differential signal, and a PP (push-pull) signal, which are obtained at that time.

FIG. 9 is a diagram illustrating a specific method of peak position detection.

DETAILED DESCRIPTION OF EMBODIMENTS

Hereinafter, preferred embodiment (hereinafter, referred to as embodiments) for carrying out the present disclosure will be described.

In the specification, before the description of the embodiment, first, a related example proposed in advance by the applicant will be described.

The description thereof will be performed in the following order.

1. Related Example
1-1. Optical Recording Medium as Recording and Reproduction Target
1-2. Configuration of Optical System
1-3. Problem of Spot Position Deviation
1-4. Structure of Reference Face
1-5. Address Information
1-6. Specific Method of Tracking Servo
1-7. Specific Spot Position Deviation Correction Method
1-8. Overall Internal configuration of Recording Device
2. Embodiment
2-1. Problem of Related Example
2-2. Configuration of Recording device of Embodiment
3. Modified Example

1. Related Example

1-1. Optical Medium as Recording and Reproduction Target

Figure 1:
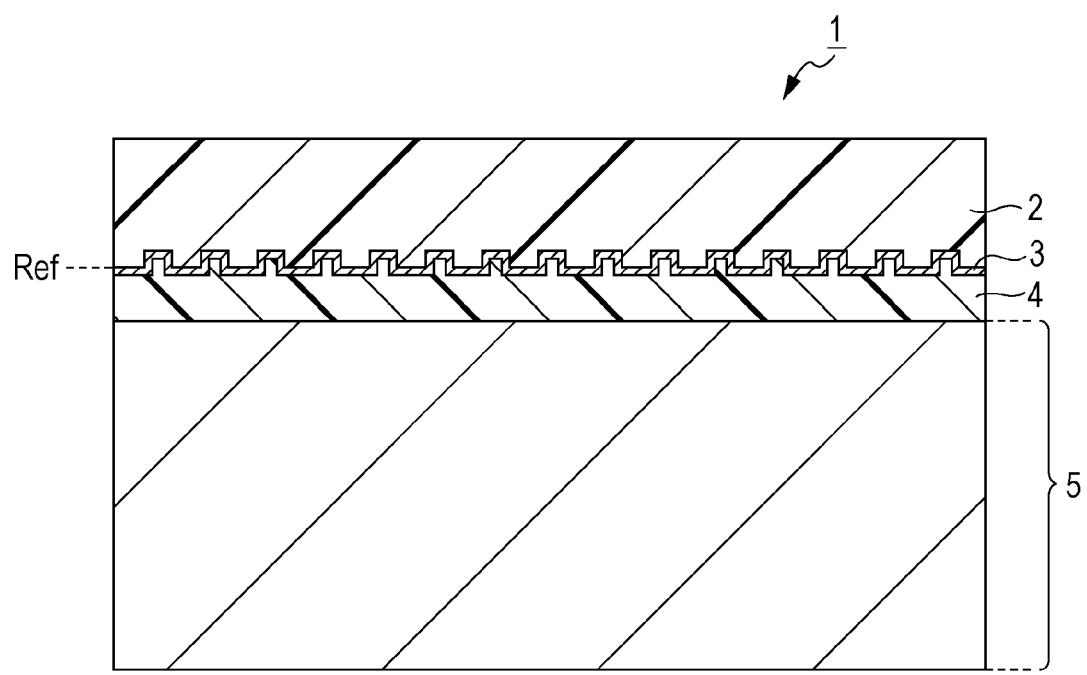
FIG. 1 is a diagram illustrating a cross-sectional structure of a bulk type recording medium as a recording and reproduction target according to a related example and an embodiment.

FIG. 1 shows a cross-sectional structural diagram of an optical recording medium as a recording and reproduction target according to a related example (and an embodiment).

The optical recording medium as the recording and reproduction target in the embodiment to be described later including the related example is a so-called bulk recording type optical medium, and is hereinafter referred to as a bulk type recording medium 1.

The bulk type optical medium indicates an optical recording medium for a so-called bulk recording. Bulk recording is a technique of performing laser light irradiation on a recording layer as a bulk layer 5 by sequentially changing the infocus position to perform multilayer recording not having a multilayer structure in which a plurality of recording films are formed like a general multilayer optical disc.

In FIG. 1, the bulk type recording medium 1 is a disc-shaped optical recording medium, and mark recording (information recording) is performed through irradiation of laser light on the bulk type recording medium 1 which is driven to rotate. Reproduction of recording information is also performed through irradiation of laser light on the bulk type recording medium 1 which is driven to rotate.

The optical recording medium is a general term for a recording medium that records and reproduces information through the irradiation of light.

As shown, the bulk type recording medium 1 is provided with a cover layer 2, a selective reflection film 3, an intermediate layer 4, and a bulk layer 5, in order from the upper layer side.

In the present specification, "upper layer side" indicates the upper layer side when the incident face of laser light from the recording device (a recording and reproducing device 10) side to be described later is set to the upper face.

In the present specification, "depth direction" is used. The "depth direction" indicates a direction coinciding with the up and down direction based on the definition of the "upper layer side" (i.e., a parallel direction to an incident direction of laser light from the recording device side: focus direction).

In the bulk type recording medium 1, the cover layer 2 is formed of resin such as polycarbonate or acryl, and pit rows to be described later as position guides for guiding a recording and reproducing position are formed on the side thereunder as shown, thereby forming a convex and concave cross-sectional shape. The cover layer 2 is generated by injection molding using a stamper provided with pit rows.

A specified formed shape of the pit rows in the bulk type recording medium 1 will be described later.

The selective reflection film 3 is formed on the side of the lower face of the cover layer 2 provided with the pit rows.

In the bulk recording method as described with reference to FIG. 23, light (servo laser light) for obtaining an tracking or focus error signal on the basis of the position guide such as the pit rows is irradiated separately from light (recording and reproducing laser light) for performing the mark recording and reproducing on the bulk layer 5 as the recording layer.

In this case, if the servo laser light reaches the bulk layer 5, there may be an adverse effect on the mark recording in the bulk layer 5. For this reason, a reflection film having selectivity in reflecting the servo laser light and passing the recording and reproducing laser light is necessary.

In the related art, laser light having different wavelength bands is used for the recording and reproducing laser light and the servo laser light in the bulk recording method, and thus a selective reflection film having wavelength selectivity of reflecting light with the same wavelength band as the servo laser light and passing light with the other wavelengths is used as the selective reflection film 3.

The bulk layer 5 as the recording layer is laminated (adhered) onto the side of the lower layer of the selective reflection film 3 through the intermediate layer 4 formed of an adhesive material such as UV curable resin for example.

As a forming material (recording material) of the bulk layer 5, an appropriate and optimal material may be employed according to the bulk recording method employed, for example, the above-described positive type micro-hologram method, negative type micro-hologram method, void recording method, and the like.

The mark recording method on the bulk layer in the present disclosure is not particularly limited, and an arbitrary method within the scope of the bulk recording method may be employed. As an example in the following description, a case of employing the void recording method is exemplified.

Figure 23:
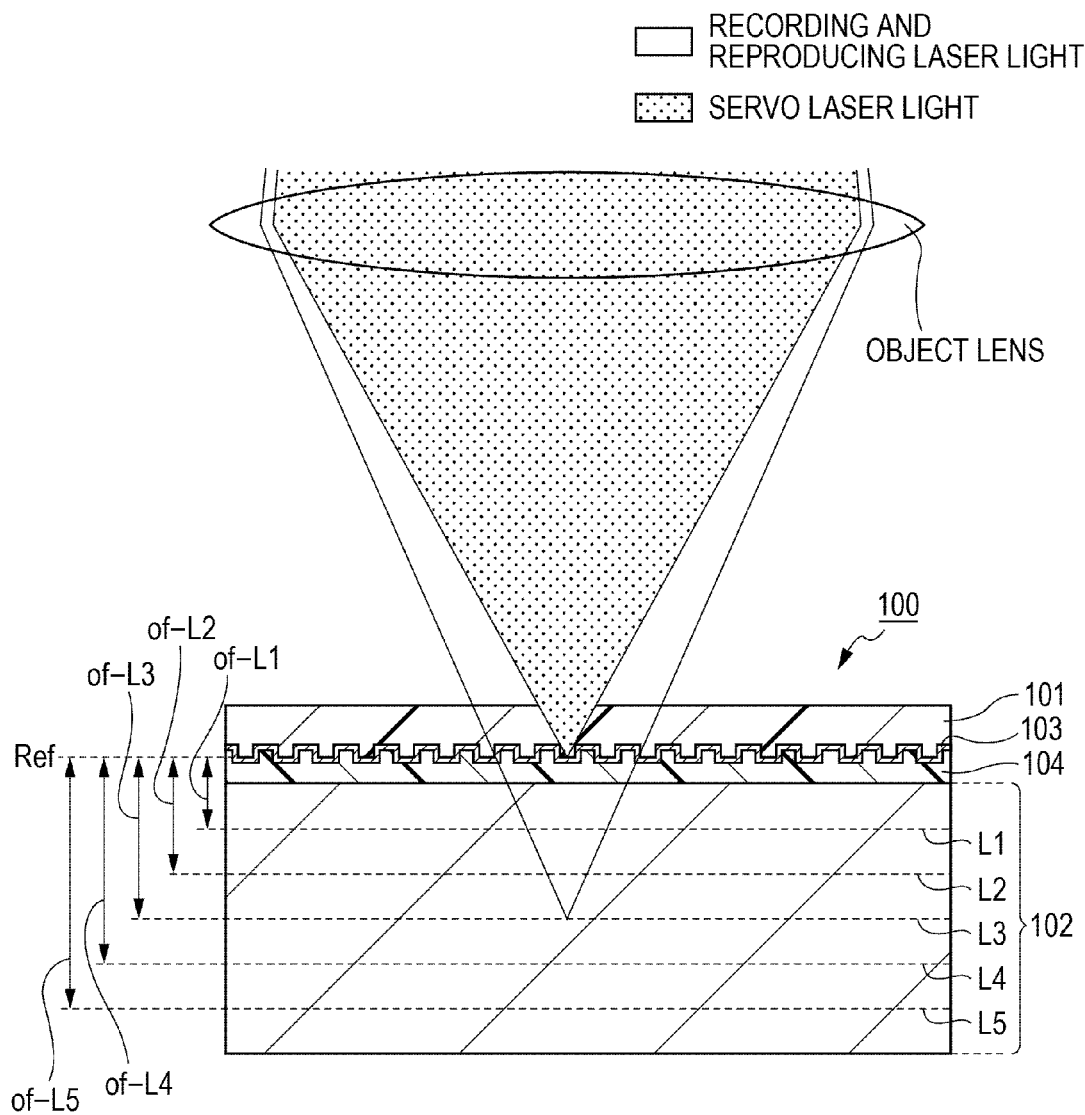
FIG. 23 is a diagram illustrating a mark recording and reproduction method on the bulk type recording medium.

When the multilayer recording is performed on the bulk layer 5 on which the guiding groove or the reflection film is not formed, it is predetermined where the layer position of recording the mark is in the depth direction in the bulk layer 5 (see FIG. 23). Also in this case, as the layer position (a mark forming position: also referred to as an information recording layer position) of forming the mark in the bulk layer 5, a total of 5 information recording layer positions L such as the first information recording layer position L1 to the fifth information recording layer position L5 are set in the same manner as the case of FIG. 23.

In this case, information of an offset of-L from the reference face Ref to the information recording layer positions L is set by a controller 41 in a recording and reproducing device 10 (and a recording and reproducing device 50) to be described later.

1-2. Configuration of Optical System

Figure 2:
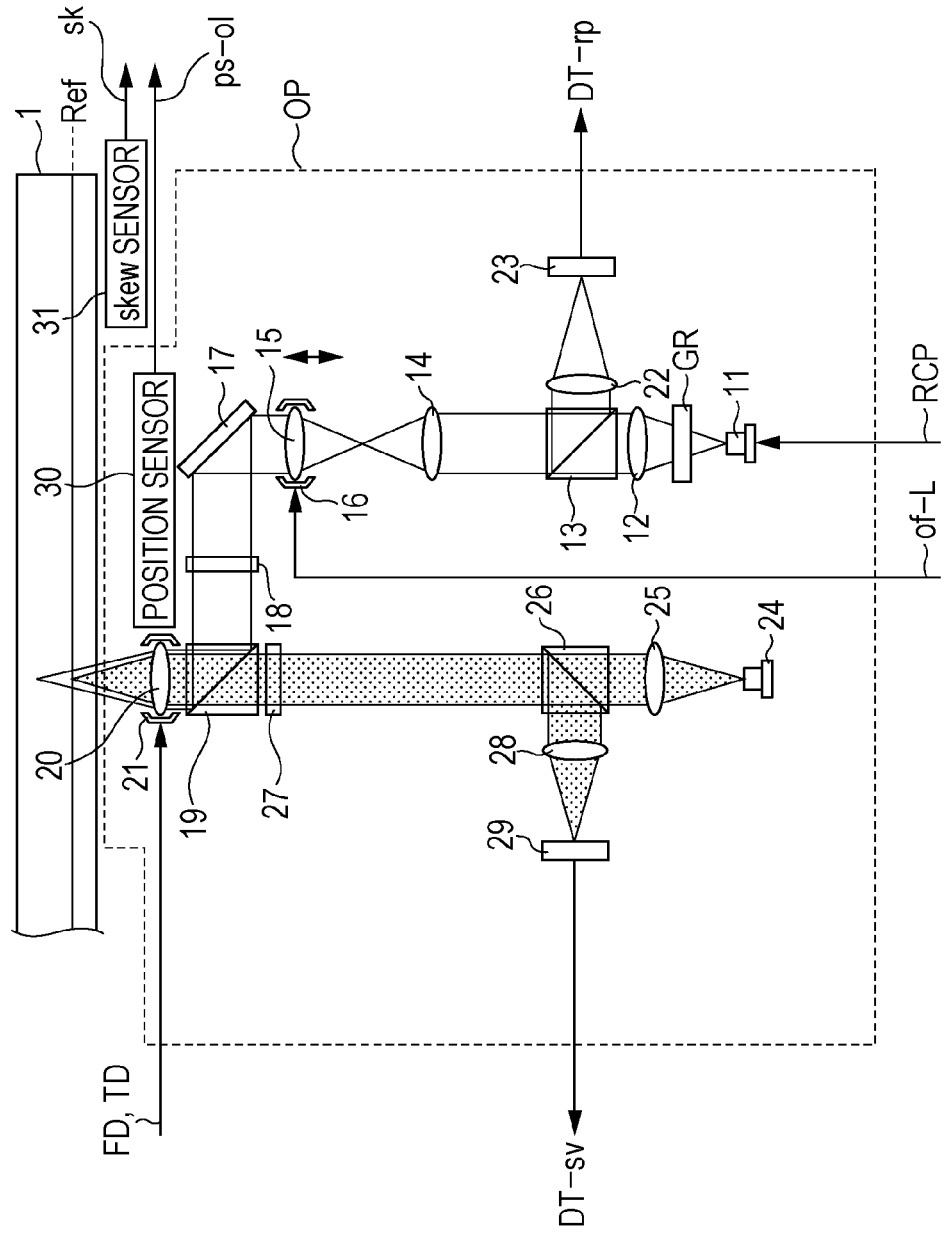
FIG. 2 is a diagram illustrating a configuration of an optical system of a recording device of the related example and the embodiment.

FIG. 2 is a diagram mainly illustrating an optical system of the recording device performing the recording and reproducing on the bulk recording medium 1 described above. Specifically, an internal configuration of an optical pickup OP of the recording and reproducing device 10 is mainly shown.

In FIGS. 4A and 4B, the bulk type recording medium 1 loaded on the recording and reproducing device 10 is set to clamp the center hole thereof at a predetermined position in the recording and reproducing device 10, and is maintained with the bulk type recording medium 1 to be rotatable using a spindle motor 43 (FIG. 12) not shown.

The optical pickup OP is provided to irradiate the bulk type recording medium 1 rotated by the spindle motor 43 with recording and reproducing laser light and servo laser light.

The optical pickup OP is provided therein with a recording and reproducing laser 11 that is a light source of recording and reproducing laser light for performing information recording based on the mark and reproduction of information recorded by the mark, and a servo laser 24 that is a light source of the servo laser light for performing the positional control using the position guides formed on the reference face Ref.

Herein, as described above, the recording and reproducing laser light and the servo laser light have different wavelengths. In the case of this example, the wavelength of the recording and reproducing laser light is about 405 nm (so-called blue and violet laser light), and the wavelength of the servo laser light is about 640 nm (red laser light).

The optical pickup OP is provided therein with the object lens 20 that is an output terminal of the recording and reproducing laser light and the servo laser light to the bulk type recording medium 1.

A recording and reproducing light receiving unit 23 for receiving reflection light of the recording and reproducing laser light from the bulk type recording medium 1, and a servo light receiving unit 29 for receiving reflection light of the servo laser light from the bulk type recording medium 1 are provided.

The optical pickup OP is provided therein with an optical system for leading the recording and reproducing laser light output from the recording and reproducing laser 11, to the object lens 20 and leading the reflection light of the recording and reproducing laser light input from the bulk type recording medium 1 to the object lens 20, to the recording and reproducing light receiving unit 23.

Specifically, the recording and reproducing laser light output from the recording and reproducing laser 11 becomes parallel light through a collimation lens 12, and then is input to a polarization beam splitter 13. The polarization beam splitter 13 allows the recording and reproducing laser light input from the recording and reproducing laser 11 side to pass as described above.

The recording and reproducing laser light passing through the polarization beam splitter 13 is input to an expander formed of a fixed lens 14, a movable lens 15, and a lens driving unit 16. The expander corresponds to the recording and reproducing light focus mechanism, the side of the expander close to the recording and reproducing laser 11 as the light source is considered as the fixed lens 14, the movable lens 15 is provided on the far side from the recording and reproducing laser 11, and the movable lens 15 is driven in a direction parallel to the optical axis of the recording and reproducing laser light by the lens driving unit 16, thereby performing independent focus control on the recording and reproducing laser light.

As will be described later, the lens driving unit 16 in the recording and reproducing focus mechanism is driven according to the value of the offset of-L set corresponding to the information recording layer position L that is set as the target by the controller 40 shown in FIG. 13.

The recording and reproducing laser light passing through the fixed lens 14 and the movable lens 15 constituting the recording and reproducing focus mechanism is reflected by a mirror 17 as shown in the drawing, and then is input to a dichroic prism 19 through a ¼ wavelength plate 18.

In the dichroic prism 19, the selective reflection face reflects light in the same wavelength band as that of the recording and reproducing laser light and allows light with the other wavelengths to pass. Accordingly, the recording and reproducing laser light input as described above is reflected from the dichroic prism 19.

The recording and reproducing laser light reflected from the dichroic prism 19 is irradiated to the bulk type recording medium 1 through the object lens 20 as shown.

The object lens 20 is provided with a 2-axes actuator 21 maintaining the object lens 20 to be changeable in position in the focus direction (direction approaching to and receding from the bulk type recording medium 1) and a tracking direction (direction perpendicular to the focus direction: radial direction of the bulk type recording medium 1).

The 2-axes actuator 21 is provided with a focus coil and a tracking coil, to which driving signals (driving signals FD and TD to be described later) are given, respectively, thereby changing the position of the object lens 20 in the focus direction and tracking direction.

During reproduction, the bulk type recording medium 1 is irradiated with the recording and reproducing laser light as described above, and thus the reflection light of the recording and reproducing laser light can be obtained from the bulk type recording medium 1 (the mark row recorded in the information recording layer L that is the reproduction target in the bulk layer 5). The reflection light of the recording and reproducing laser light obtained as described above is led to the dichroic prism 19 through the object lens 20 and is reflected from the dichroic prism 19.

The reflection light of the recording and reproducing laser light reflected from the dichroic prism 19 passes through the ¼ wavelength plate 18, the mirror 17, and the recording and reproducing focus mechanism (from the movable lens 15 to the fixed lens 14), and then is input to the polarization beam splitter 13.

The polarization direction of the reflection light (returning light) of the recording and reproducing laser light input to the polarization beam splitter 13 as described above is changed by 90° from the recording and reproducing laser light (outward light) input from the recording and reproducing laser light 11 side to the polarization beam splitter 13 by the action of the ¼ wavelength plate 18 and the action at the reflecting time from the bulk type recording medium 1. As a result, the reflection light of the recording and reproducing laser light input as described above is reflected from the polarization beam splitter 13.

The reflection light of the recording and reproducing laser light reflected from the polarization beam splitter 13 as described above is condensed on the light receiving face of the recording and reproducing light receiving unit 23 through a condensing lens 22.

In addition to the configuration of the optical system on the recording and reproducing laser light, the optical pickup OP is provided therein with an optical system for leading the servo laser light output from the servo laser 24, to the object lens 20, and leading the reflection light of the servo laser light from the bulk type recording medium 1 input to the object lens 20, to the servo light receiving unit 29.

As shown, the servo laser light output from the servo laser 24 becomes parallel light through a collimation lens 25, and then is input to a polarization beam splitter 26. The polarization beam splitter 26 allows the servo laser light (outward light) input from the servo laser 24 side to pass as described above.

The servo laser light passing through the polarization beam splitter 26 is input to the dichroic prism 19 through a ¼ wavelength plate 27.

As described above, since the dichroic prism 19 reflects light in the same wavelength band as that of the recording and reproducing laser light and allows light with the other wavelengths to pass, the servo laser light passes through the dichroic prism 19 and is irradiated to the bulk type recording medium 1 through the object lens 20.

The reflection light (the reflection light from the reference face Ref) of the servo laser light obtainable by the irradiation of the servo laser light to the bulk recording medium 1 as described above passes through the dichroic prism 19 after passing through the object lens 20 and is input to the polarization beam splitter 26 through the ¼ wavelength plate 27.

In the same manner as the case of the previous recording and reproducing laser light, the polarization direction of the reflection light (returning light) of the servo laser light input from the bulk type recording medium 1 side is different from that of the outward light by 90° due to the action of the ¼ wavelength plate 27 and action during reflection in the bulk type recording medium 1 as described above, and thus the reflection light of the servo laser light as the returning light is reflected from the polarization beam splitter 26.

The reflection light of the servo laser light reflected from the polarization beam splitter 26 is condensed on the light receiving face of the servo light receiving unit 29 through the condensing lens 28.

Although not described in the drawing, in practice, the recording and reproducing device 10 is provided with a slide driving unit which drives the whole of the optical pickup OP described above to slide in the tracking direction, and the irradiation position of the laser light can be widely changed by driving the optical pickup OP by the slide driving unit.

In this case, the optical pickup OP is provided therein with a position sensor 30 and a skew sensor 31, however they will be described later again.

1-3. Problem of Spot Position Deviation

When the bulk recording method described above is employed, a spot position deviation in the inner direction of the recording face occurs between the recording and reproducing laser light and the servo laser light due to the occurrence of a so-called skew (tilt) or the occurrence of lens shift of the object lens 20 caused by disc eccentricity.

FIG. 3A and FIG. 3B schematically show the spot position deviation between the recording and reproducing laser light and the servo laser light caused by the occurrence of the skew.

In the non-skewed state shown in FIG. 3A, the spot positions of the servo laser light and the recording and reproducing laser light coincide in the inner direction of the recording face. On the contrary, a difference in the optical axis between the servo laser light and the recording and reproducing laser light occurs, and a spot position deviation $\Delta x$ shown in the drawing occurs according to the occurrence of the skew as shown in FIG. 3B.

FIG. 4A and FIG. 4B schematically show the spot position deviation between the recording and reproducing laser light and the servo laser light caused by the lens shift.

In the non-lens shift state shown in FIG. 4A, the object lens 20 is at the reference position, and the center of the object lens 20 and the optical axis c of each laser light incident to the object lens 20 coincide with each other. The optical system is designed such that the spot positions in the inner direction of the recording face of each laser light coincide in the state where the object lens is at the reference position as described above.

On the contrary, when the object lens 20 is shifted from the reference position to follow the disc eccentricity as shown in FIG. 4B by the tracking servo control (in this case, shifted to the left on the paper surface), the spot position deviation $\Delta x$ shown in the drawing occurs.

The spot position deviation caused by the lens shift occurs due to the difference in the incidence shapes of the servo laser light and the recording and reproducing laser light with respect to the object lens 20. Specifically, while the servo laser light is incident to the object lens 20 by substantially parallel light, the recording and reproducing laser light is incident by unparallel light.

According to the occurrence of the spot position deviation in the servo laser light and the recording and reproducing laser light caused by the skew or lens shift, difference in the information recording position in the bulk layer 5 occurs. That is, as understood from the above description, the spot position of the recording and reproducing laser light during recording is controlled by performing the tracking servo control of the object lens 20 based on the reflection light of the servo laser light, and thus the recording may not be performed at the intended position in the bulk layer 5 according to the occurrence of the spot position deviation described above.

At this time the information recording positions may be overlapped between the adjacent tracks according to the setting of the amount of skew eccentricity or track pitches (intervals of formation of position guides). Specifically, the disc eccentricity or skew is caused by the manner in which the disc is clamped to the spindle motor 43, and may occur in different manners whenever the disc is loaded. Accordingly, for example, if rewriting based on disc switching is performed on a disc, the shape of the skew eccentricity occurring at the previous recording time and the shape of the skew eccentricity occurring at the rewriting time are different. As a result, there is a problem in that an overlap between the mark row of the recorded portion and the mark row of the rewriting portion occurs or in that they intersect with each other in some cases.

If so, it is difficult to correctly reproduce the reproducing signal.

As one method for preventing the overlap or the intersection of the mark rows from occurring, the track pitches may be set wide on the reference face Ref.

However, when the track pitches of the reference face Ref are widened, it follows that, the recording capacity in the bulk layer 5 is reduced.

To prevent the deviation of the information recording position from occurring, the spot position deviation of the recording and reproducing laser light is corrected from the result of the detection of the skew or lens shift.

As understood from FIG. 3A, FIG. 3B, FIG. 4A, and FIG. 4B, the amount of skew occurring and the amount of spot position deviation, and the amount of lens shift and the amount of spot position deviation have respective correlation. From this point, the correction amount of the spot position deviation caused by the skew is calculated from the result of the detection of the amount of skew, the correction amount of the spot position deviation caused by the lens shift from the result of the detection of the amount of lens shift, then the sum thereof is calculated, and thus it is possible to calculate the correction amount for correcting the spot position deviation caused by both the skew and the lens shift. In addition, it is possible to correct the deviation of the information recording position on the basis of the calculated correction amount.

To perform the correction of the deviation of the information recording position, the recording and reproducing device 10 is provided with the position sensor 30 and the skew sensor 31 shown in FIG. 2.

In FIG. 2, the position sensor 30 is provided in the vicinity of the object lens 20, and detects a position (the amount of deviation from the reference position) in the tracking direction of the object lens 20. That is, the amount of lens shift of the object lens 20 is detected.

A position detection signal ps-ol of the position sensor 30 is supplied to the controller 41 to be described later.

Various means other than the position sensor 30 are conceivable as means for detecting the amount of lens shift.

The skew sensor 31 detects an inclination (skew) of the bulk type recording medium 1. For example, in this case, the skew sensor 31 is provided with a light irradiating unit that irradiates the bulk type recording medium 1 with light at a predetermined angle, and a light receiving unit that receives reflection light of the light irradiated by the light irradiating unit from the bulk type recording medium 1, and detects the amount of deviation of the light reception position of the reflection light of the light receiving unit to detect the amount of inclination of the bulk type recording medium 1.

The detection signal (also referred to as a skew detection signal sk) detected by the skew sensor 31 is supplied to the controller 40.

The specific configuration for detecting skew is not limited to the configuration exemplified above.

As one specific method for correcting the information recording position on the basis of the amount of deviation of the information recording position obtained on the basis of the detection result of the position sensor 30 or the skew sensor 31, there is, for example, a method of changing the optical axis of the recording and reproducing laser light on the basis of the detected deviation amount. Specifically, it is possible to correct the deviation of the information recording position by changing the optical axis of the recording and reproducing laser light using, for example, a galvano mirror or the like.

However, to correct the deviation of the information recording position by the method of changing the optical axis of the recording and reproducing laser light, it is necessary to add a separate configuration such as a galvano mirror, thereby increasing the number of components and increasing the production cost.

In the related example (and the embodiment to be described later), the correction of the deviation of the information recording position is realized by shifting the tracking servo target position from the original target position (i.e., a track to record). That is, under the tracking servo control of the object lens 20 along the position guide based on the servo laser light as described above, the tracking servo target position is shifted from the track to record by the extent corresponding to the correction amount. As a result, it is possible to control the information recording position to coincide with the track position to record.

As described above, by the method of shifting the tracking servo target position from the original target position, for example, the separate additional configuration for adjusting the optical axis of the recording and reproducing laser light is not necessary, and it is possible to reduce the number of components and to reduce the production cost.

1-4. Structure of Reference Face

The correction of the information recording position is performed by offsetting the tracking servo target position based on the servo laser light as described above, and thus the bulky type recording medium 1 shown in FIG. 1 is provided with the pit rows of the shape to be described hereinafter on the reference face Ref.

Figure 5:
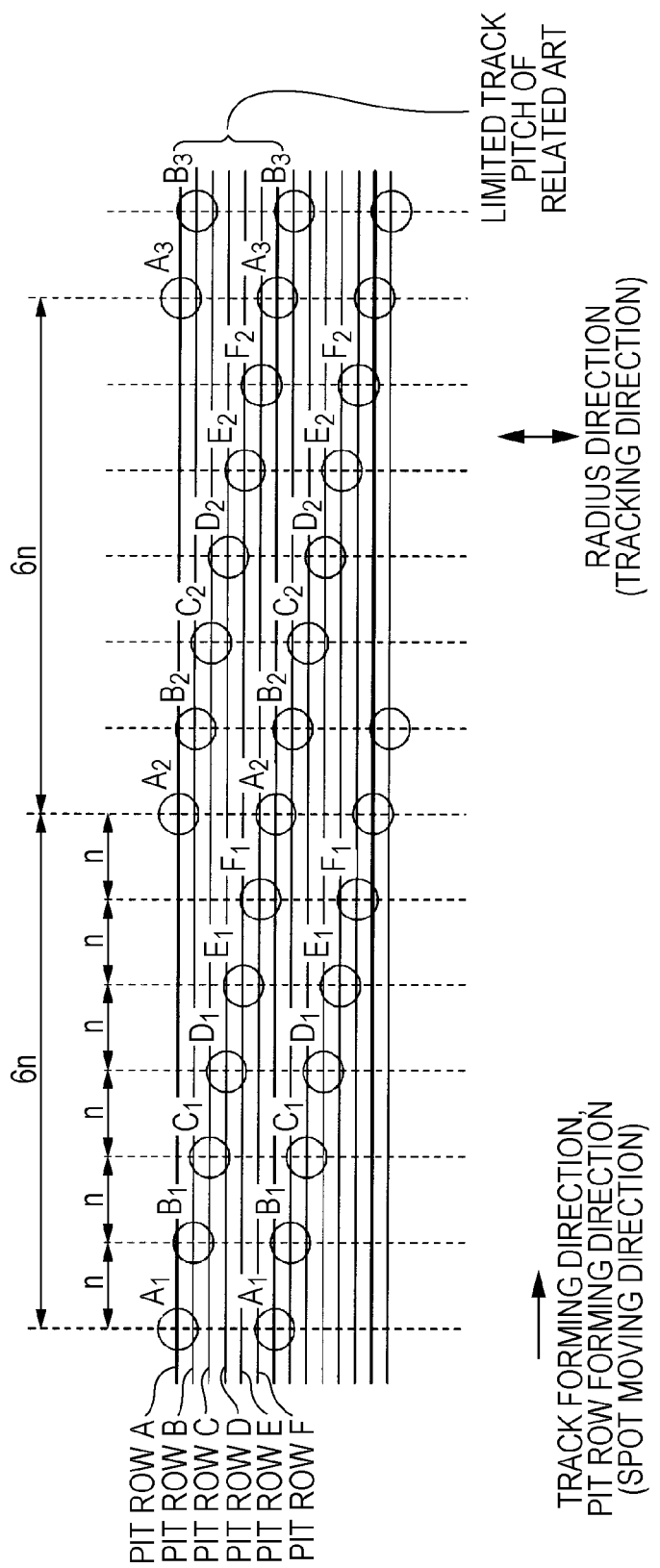
FIG. 5 is a plan view illustrating a partially enlarged surface of a reference face of a bulk type recording medium used in the related example and the embodiment.

FIG. 5 is a plan view of partially enlarging the surface of the reference face Ref (the selective reflection film 3) in the bulk type recording medium 1.

In FIG. 5, a direction from left to right on the paper surface is a direction in which pit row is formed, that is, the direction in which the track is formed. In this case, the spot of the servo laser light is moved from left to right on the paper surface by the rotation of the bulk type recording medium 1.

A direction (the longitudinal direction of the paper surface) perpendicular to the direction in which pit row is formed is the radial direction of the bulk type recording medium 1.

In FIG. 5, A to F represented by white circles in the drawing indicate pit formable positions. That is, in the reference face Ref, the pits are formed only at the pit formable position, and the pits are not formed at positions other than the pit formable positions.

Classification of the signs of A to F in the drawing indicates classification of the pit rows (classification of the pit rows arranged in the radial direction), and numerals attached to the signs of A to F indicate classification of the pit formable positions on the pit rows.

The interval represented by black thick lines in the drawing indicates the minimum track pitch (track pitch of the related art) which can be realized in the bulk type recording medium 1 of the related art. As understood from this, in the bulk type recording medium 1 of this example, a total of 6 pit rows A to F are arranged within a limit 1-track width of the related art in the radial direction.

However, when the plurality of pit rows are merely arranged within the limit of the related art of 1-track width, the formation position of the pits may overlap in the pit row formation direction, and thus the interval of the pits in the pit row formation direction may exceed the optical limit.

In this example, the following conditions are determined such that the intervals between the pit rows A to F arranged within the limit 1-track width of the related art in the pit row forming direction do not exceed the optical limit and the following conditions are set:

1) In the pit rows A to F, the intervals of pit formable positions are limited to a predetermined first interval; and 2) The intervals of the pit formable positions of each of the pit rows A to F which are limited as described above are arranged such that the pit formable positions deviate in the pit row formation direction by a predetermined second interval (i.e., phases of the pit row are shifted by the second interval).

Herein, the interval (the second interval) in the pit row formation direction of the pit formable positions in the pit rows A to F arranged in the radial direction is n. In this case, all of the pit rows A to F are arranged to satisfy the 2) condition, the intervals of the pit formable positions of the pit rows A-B, the pit rows B-C, the pit rows C-D, the pit row D-E, the pit rows E-F, and the pit rows F-A are all n as shown.

The intervals (the first interval) of the pit formable positions in the pit rows A to F are 6n since a total of 6 pit row phases of A to F are realized in this case.

In the embodiment, the information reproduction based on the servo laser light on the reference face Ref is performed under the condition of wavelength $\lambda=640$ and numerical aperture $NA=0.65$ as the same as the case of a DVD (Digital Versatile Disc). On the contrary, in this embodiment, a section length of the pit formable positions is a section length of 3T (T is a channel bit) in the same manner as the shortest mark in the DVD, and intervals between the edges of the pit formable positions of A to F in the pit row formation direction is set to a length of the same 3T. In other words, it is n=6T.

As a result, the conditions 1) and 2) are satisfied.

Herein, to understand a pit forming shape on the entirety of the reference face Ref, a more specific pit row forming method will be described with reference to FIG. 6.

Figure 6:
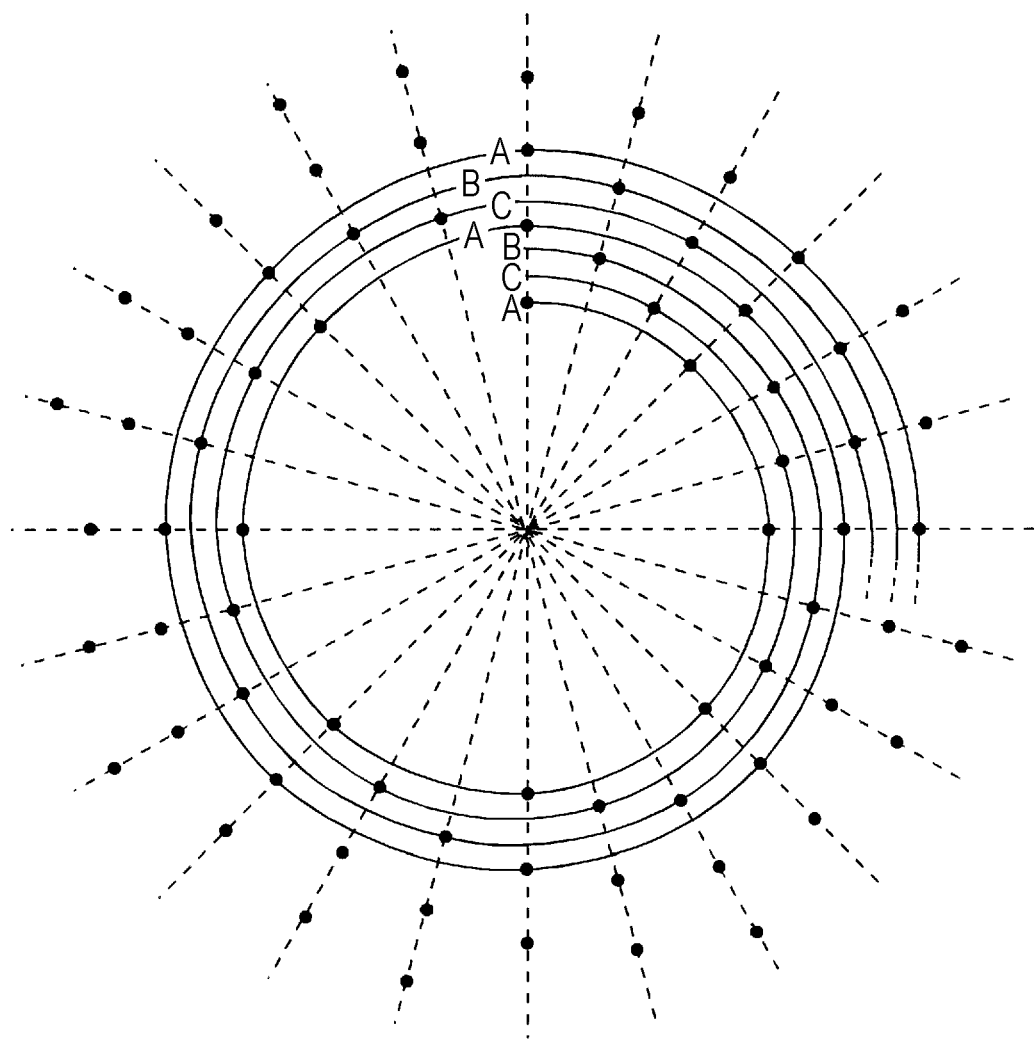
FIG. 6 is a diagram illustrating a forming shape of pits on the whole of the reference face.

In FIG. 6, in view of circumstances as shown, a case where there are only three kinds (phases) of pit rows A to C is exemplified.

In the drawing, the black circles indicate the pit formable positions.

As can be seen with reference to FIG. 6, on the reference face Ref of the bulk type recording medium 1, plural kinds of pit rows (in FIG. 6, three kinds A to C, but in practice six kinds A to F) having different phases are one set, and the one set of plural kinds of pit rows is formed in a spiral shape.

The tracking servo on one necessary pit row of the plural kinds of pit rows continues, and the spot position draws a spiral trace.

On the reference face Ref, the pit is formed by the CAV (Constant Angular Velocity) method. From this, as shown, each of the plural kinds of pit rows can be aligned at an angular position where the pit formation positions (pit formable positions) are the same, in the radial direction.

The reason for recording the pits on the reference face Ref in the CAV method as described above is because the phase relationship of the pit rows A to F as shown in FIG. 5 is to be kept in any area on the disc.

1-5. Address Information

Subsequently, an example of a format of address information recorded on the reference face Ref will be described with reference to FIG. 7A, FIG. 7B, and FIG. 7C.

First, FIG. 7A schematically shows the relationship of the pit formable positions of the pit rows (A to F) having different pit row phases. FIG. 7A shows the pit formable positions by "*" marks.

As will be described later, in the recording and reproducing device 10 of the embodiment, one pit row is selected from the pit rows A to F, and the tracking servo is performed on the one selected pit row as a target.

However, a problem in this case is that the pit rows A to F are arranged at intervals exceeding the optical limit of the related art in the radial direction. That is, in this case, as a tracking error signal obtained by moving (scan) the beam spot on the track is a signal which reflects all the pits of A to F, and thus it is difficult to trace the one selected pit row even when the tracking servo is performed on the basis of the tracking error signal.

For this reason, as described above, the recording and reproducing device 10 of the example extracts the tracking error signal in the section of the pit formable position in the selected pit row, and the tracking servo is performed on the basis of the extracted tracking error signal (i.e., intermittently).

In the same manner, when reading the address information, a sum signal (a sum signal to be described later) of the section of the pit formable position of the selected pit row is extracted such that only information recorded in the selected pit row is selectively read, and a method of detecting the address information on the basis of the extracted sum signal is employed.

To cope with such a method of detecting the information, in the example, a format of representing "0" and "1" of channel bit (recording mark) according to whether or not the pits are formed at the pit formable positions is employed. That is, one pit formable position takes charge of information of one channel bit.

1 bit of the data bit is represented by the data pattern of "0" and "1" based on the plurality of channel bits.

Specifically, in this example, as shown in FIG. 7B, the data bits "0" and "1" are represented by 4 channel bits, for example, a pattern "1011" of the 4 channel bits indicates a data bit "0" and a pattern "1101" of the 4 channel bits indicates a data bit "1".

In this case, an important point is that the channel bit "0" is not continuous. That is, the continuation of the channel bit "0" means that a period when it is difficult to obtain the error signal is continuous when the servo is performed intermittently using the track error signal intermittently as described above. Accordingly, it is very difficult to secure precision of the tracking servo.

For this reason, in the example, for example, a condition in which the channel bit "0" is not continuous is satisfied by the definition of the data bit as described above. That is, the decrease in the precision of the tracking servo is suppressed to the minimum by the definition of the data bit as described above.

FIG. 7C shows an example of a sync pattern.

For example, in the sync pattern, as shown, the pattern is represented by 12 channel bits, the former 8 bits are a channel bit pattern "11111111" which is not matched with the definition of the data bit, and classification (kind) of sync is represented by the pattern of the latter 4 channel bits. Specifically, when the pattern of the 4 channel bits subsequent from the 8 bits is "1011", the sync pattern is Sync1, and when the pattern is "1101", the sync pattern is Sync2.

In the bulk type recording medium 1, the address information is recorded subsequently from the sync as described above.

As the address information, at least absolute positional information (information of radial position, and information of rotation angle position) is recorded.

In order to confirm, in this example, the plurality of pit rows A to F are arranged within the limit 1-track width of the related art, but the recording of the address information is performed to assign individual information for each pit row such that the radial positions of the pit rows are individually represented (the pit rows can be recognized). That is, the same address information is not recorded for each pit row of A to F arranged within the limit 1-track width of the related art.

As understood from the description of FIG. 7A, FIG. 7B and FIG. 7C, the pits are position-recorded on the reference face Ref of the bulk type recording medium 1. The position recording is a method in which a pit (or mark) formed portion is "1" and the other portion is "0".

1-6. Specific Method of Tracking Servo

A method of performing the tracking servo on an arbitrary pit row as a target from the pit row group formed to arrange the plurality of pit rows within the 1-track width of the related art as described above will be described in detail hereinafter.

FIG. 8 schematically shows the relationship between a state of moving the spot of the servo laser light on the reference face Ref by the rotation of the bulk type recording medium 1, waveforms of a sum signal, a sum differential signal, and a push-pull signal PP (also referred to as a PP signal), which are obtainable at that time.

The sum signal is a sum signal of the light receiving signal DT-sv obtained by the plurality of light receiving elements as the servo light receiving unit 29 shown in FIG. 2, and the sum differential signal is a signal obtainable by differentiating the sum signal.

In this drawing, for convenience of description, it is assumed that pits are formed at all the pit formable positions in the drawing.

As shown, the beam spot of the servo laser light is moved by the rotation of the bulk type recording medium 1, and thus a signal level of the sum signal forms a peak at a cycle corresponding to the arrangement interval in the pit row formation direction of the pits of A to F. That is, the sum signal indicates an interval (forming cycle) in the pit row formation direction of the pits of A to F.

In the example of this drawing, since the spot of the servo laser light is moved along the pit row A, the peak value of the sum signal becomes the maximum (absolute value) when the sum signal passes through the formation position of the pit A in the pit row formation direction, and the peak value tends to gradually decrease throughout the formation positions of the pit B to the pit D. Thereafter, the peak value changes to an upward trend in order of the formation position of the pit E to the formation position of the pit F, and the peak value becomes the maximum when reaching the formation position of the pit A again. That is, since there is an effect of the pits in the pit rows E and F adjacent to the outer circumferential side at the formation positions of the pits E and F in the pit row formation direction, the peak value of the sum signal increases in order of each formation position of the pits E and F.

As the sum differential signal generated by differentiating the sum signal and the PP signal as the tracking error signal, it is possible to obtain waveforms as shown.

The sum differential signal is used to generate a clock CLK according to the interval in the pit row formation direction of the pit formation positions (strictly, the pit formable positions) of the pits A to F.

Specifically, by using the sum differential signal as the clock CLK, a signal in which the position corresponding to the center position (peak position) of each pit is the rising position (timing) is generated.

As a method of generating the clock CLK, first, a signal obtained by slicing the sum signal by the predetermined threshold value Th1 shown in FIG. 9 and similarly a signal obtained by slicing the sum differential signal by the predetermined threshold value Th2 are generated. The timing signal having the rising timing corresponding to the peak position is generated by taking AND of both signals.

The clock CLK is generated by performing a PLL (Phase Locked Loop) process in which the timing signal generated as described above is considered as an input signal (reference signal).

Figure 10:
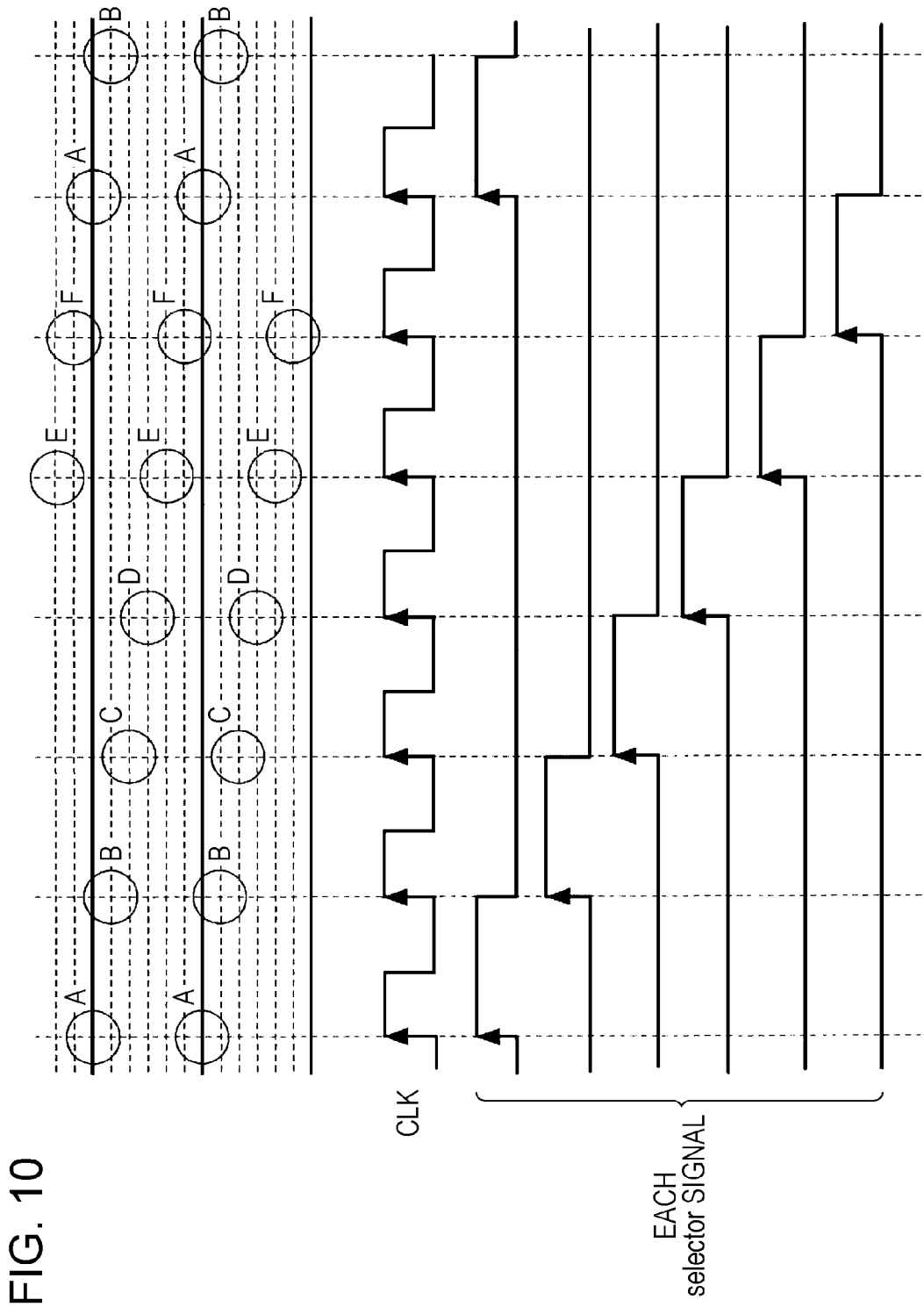
FIG. 10 is a diagram schematically illustrating the relationship of a clock generated from a timing signal representing a peak timing, a waveform of each selector signal generated on the basis of the clock, and (a portion of) pit rows formed on the reference face.

FIG. 10 schematically shows the relationship between waveforms of the clock CLK generated by the sequence and selector signals generated on the basis of the clock CLK, and (a portion of) each of the pit rows formed on the reference face Ref.

As can be clearly seen from the drawing, the clock CLK becomes a signal having a cycle based on the formation intervals of the pits A to F. Specifically, it becomes a signal having the rising timing at the peak position of the pits A to F.

In the embodiment, 6 kinds of selector signals representing the timing of each of the pit formable positions of A to F are generated from the clock CLK.

Specifically, the selector signals are generated by dividing the clock CLK by ⅙, and each of the phases is deviated by ⅙ cycle. In other words, each of the selector signals is generated by dividing the clock CLK by ⅙ at each timing to deviate the rising timing by ⅙ cycle.

The selector signals becomes signals indicating the timings of the pit formable positions of the corresponding pit rows A to F, respectively. In the related example and the embodiment, after the selector signals are generated, an arbitrary selector signal is selected, and the tracking servo control is performed according to the tracking error signal within the period represented by the selected selector signal, to trace the beam spot of the servo laser light on the arbitrary pit row of the pit rows A to F.

Since the tracking servo control on the arbitrary pit row of the pit rows A to F is possible, the offset of the spot position of the servo laser light in which the deviation of the information recording position based on the recording and reproducing laser light is to be corrected may be performed at least at the intervals of the pit rows A to F. That is, the information recording position based on the recording and reproducing laser light can be finely adjusted at a narrower interval than the one track width of the related art. Specifically, the information recording position can be corrected at the precision of dividing one track width of the related art into 6 portions.

1-7. Specific Spot Position Deviation Correction Method

In actuality, when the spot position deviation is corrected, the correction of the information recording position based on the precision of the ⅙ track width of the selection of the pit row is made possible, and then the correction is made possible with high precision. Specifically, the offset is applied into the tracking servo loop, for example, the offset is applied to the tracking error signal for the selected pit row, and the additional fine adjustment over the ⅙ track width is made possible.

A specific method of the spot position deviation correction also including the offset application to the tracking servo loop will be described with reference to FIG. 11A and FIG. 11B.

Figure 11:
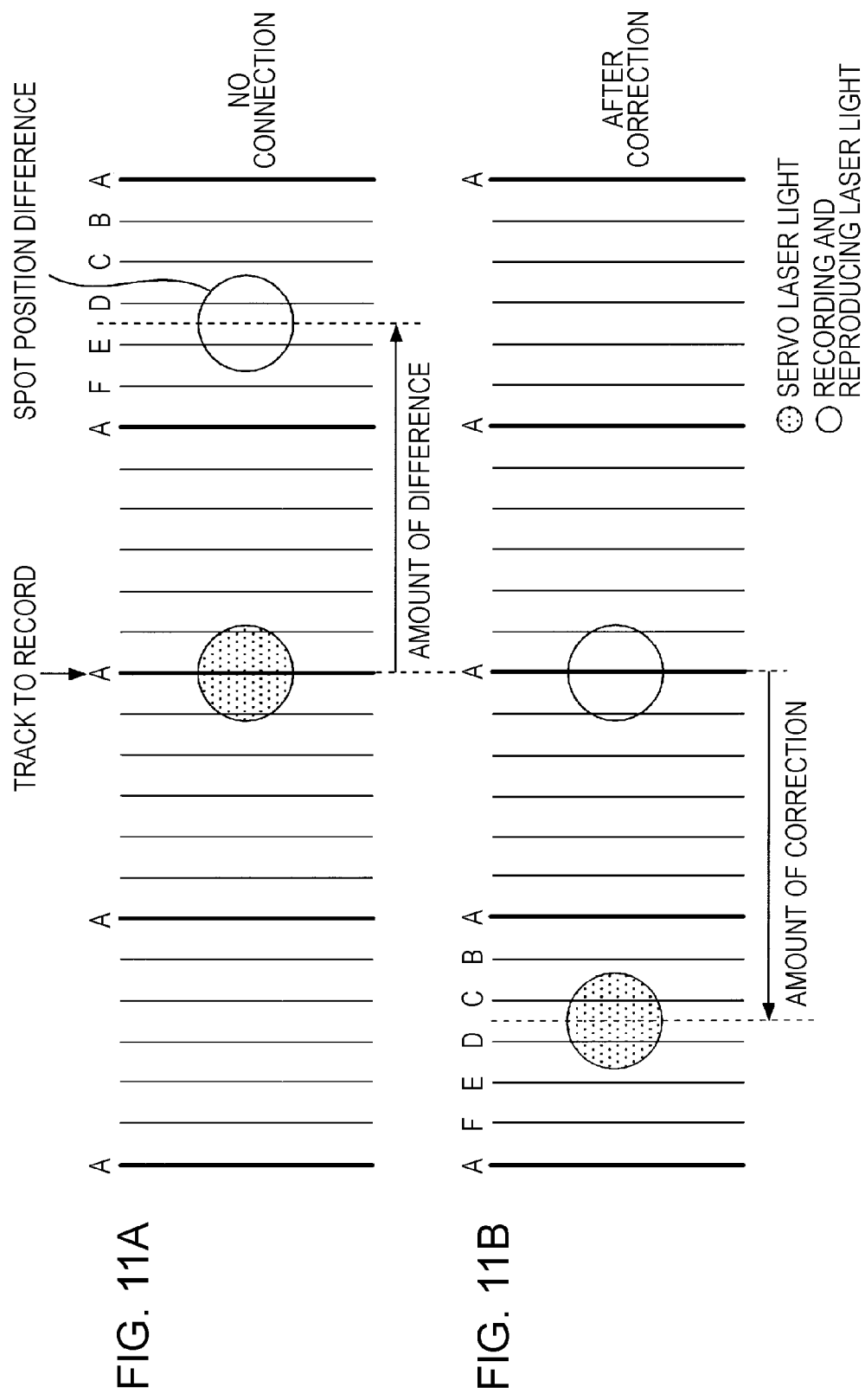
FIG. 11A and FIG. 11B are diagrams illustrating a specific method of correction of spot position deviation.

Each of FIG. 11A and FIG. 11B shows the pit rows arranged in the radial direction on the reference face Ref and the spots of the servo laser light and the recording and reproducing laser light, in which FIG. 11A shows a non-correction state, and FIG. 11B shows a state after correction.

In FIG. 11A, in the non-correction state, the tracking servo control based on the reflection light of the servo laser light is performed such that the spot position of the servo laser light is on the track (pit row) to record.

The spot position of the recording and reproducing laser light is at a position deviating from the track to record as shown, due to the occurrence of skew or lens shift. Specifically, in the drawing, a case where the spot position deviation of the recording and reproducing laser light occurs by 8.5 pit rows is exemplified.

The amount of deviation of the spot position of the recording and reproducing laser light may be detected by the position sensor 30 and the skew sensor 31 shown in FIG. 2. In other words, a value (FIG. 11B) of the correction amount for correcting the spot position deviation of the recording and reproducing laser light occurring as described above is calculated on the basis of the detection result of the position sensor 30 and the skew sensor 31.

In this case, the value of the position detection signal ps-ol of the position sensor 30 and the value of the skew detection signal sk of the skew sensor 31 do not directly indicate the value of the correction amount as shown in FIG. 11B. It follows that, the value of the position detection signal ps-ol and the value of the skew detection signal sk are regulated to calculate the value of the correction amount as the amount of offset of the tracking servo target position.

Specifically, in this example, the correction amount (the amount of offset of the tracking servo target position) AD_OFS for correcting the spot position deviation caused by skew and lens shift is calculated on the basis of the following concept.

First, the correction amount AD_SK for correcting the spot position deviation caused by skew and the correction amount AD_SH for correcting the spot position deviation caused by lens shift are individually considered.

$$AD\_SK = (sk\text{-offset}\_SK) \times gain\_SK \quad \text{Formula 1}$$

$$AD\_SH = (ps\text{-}ol\text{-offset}\_SH) \times gain\_SH \quad \text{Formula 2}$$

In Formula 1, the offset_SK and the gain_SK are correction coefficients set to calculate the correction amount AD_SK for correcting the spot position deviation caused by skew on the basis of the value of the skew detection signal sk.

Similarly, in Formula 2, the offset_SH and the gain_SH are correction coefficients set to calculate the correction amount AD_SH for correcting the spot position deviation caused by lens shift on the basis of the value of the position detection signal ps-ol.

The correction amount AD_SK for the spot position deviation caused by skew and the correction amount AD-SH for the spot position deviation caused by lens shift are individually considered, and a correction amount AD_OFS for correcting the spot position deviation caused by both of skew and lens shift is calculated by the following Formula 3.

$$AD\_OFS = AD\_SK + AD\_SH + D\_alm \quad \text{Formula 3}$$

In Formula 3, D_alm is a correction coefficient indicating the alignment deviation of the optical axis positions of the recording and reproducing laser light and the servo laser light.

The regulated correction amount AD_OFS is calculated from the value of the skew detection signal sk of the skew sensor 31 and the value of the position detection signal ps-ol of the position sensor 30 by the calculations of Formula 1 to Formula 3 as described above.

The correction amount AD_OFS calculated as described above is distance information. In the example described above, since the correction of the spot position deviation comes with the selection of the pit row of the tracking servo target, it is necessary to perform a process of specifying the pit row that is the tracking servo target from the value of the correction amount AD_OFS calculated as described above. Specifically, the value of the correction amount AD_OFS is divided by the value of the pit row formation pitch to calculate the number of pit rows to be offset from the track to record shown in FIG. 11A. As a result, the pit row that is the tracking servo target is specified.

The value obtainable by the result of the division indicates a value of offset to be given to the tracking servo loop for correction, and the value is acquired. Specifically, in the example of FIG. 11A and FIG. 11B, the value of ½ pit row formation pitch is the value of the offset.

The value (the value of the offset applied to the tracking servo loop for correction) of the offset obtainable in the course of specifying the pit row to be the tracking servo target from the value of the correction amount AD_OFS as described above is referred to as an offset ofs.

The pit row (the pit row to be the tracking servo target for correction) specified from the value of the correction value AD_OFS as described above is referred to as a correction target pit row.

The correction target pit row is specified on the basis of the correction amount AD_OFS and the offset ofs is acquired as described above, and then the tracking servo target position based on the servo laser light is offset on the basis of the information. Specifically, the selector signal representing the timing of the pit formable position of the correction target pit row is selected, the tracking servo control based on the tracking error signal obtainable by sample-holing the push-pull signal PP is performed at the timing represented by the selected selector signal, the tracking servo control for the correction target pit row is performed, the acquired offset ofs is applied into the tracking servo loop in that state, and the tracking servo target position is offset by the correction amount AD_OFS.

By performing the tracking servo control on the correction target pit row and applying the offset ofs into the tracking servo loop, the target value of the tracking servo control for the servo laser light is offset by the extent corresponding to the value of the calculated correction amount AD-OFS. Accordingly, as shown in FIG. 11B, the spot position of the servo laser light is offset from the track position to record by the correction amount AD_OFS, and the spot position of the recording and reproducing laser light coincides with the track to record. As a result, the deviation of the information recording position is corrected.

In order to confirm, the correction with high precision over the pit row formation interval is realized by applying the offset ofs calculated from the correction amount AD_OFS into the tracking servo loop as described above.

As shown in the example of FIG. 11A and FIG. 11B, when the correction amount AD_OFS is a value equal to or more than a half of the limit track of the related art (i.e., in this case, it is a value equal to or more than 3 pit rows), the jump pulse is applied to move the spot position of the servo laser light in the direction of the correction target pit row, thereby being in a state where the selective switching of the tracking servo target pit row based on the selection switching of the selector signal is possible.

As understood with reference to FIG. 8 and FIG. 10, the pit row which is selectively switchable as the tracking servo target by the selection switching of the selector signal in the state where the tracking servo is performed on any pit row becomes a pit row positioned within a distance less than a half (3 pit rows) of the limit track of the related art as the center of the pit row that is the servo target. That is, as shown in FIG. 11A, in the state where the pit row of the servo target before the correction is the pit row A, the pit rows which are selectively switchable for the tracking servo target by the selective switching of the selector signal become the pit row B, the pit row C, the pit row F, and the pit row E. As shown in the example of FIG. 11A and FIG. 11B, when the correction target pit row is positioned at the position far away from the pit row that is currently the tracking servo target by the half or more of the limited track of the related art, the tracking servo is momentarily turned off, and then the jump pulse is applied in the direction of the correction target pit row to move the spot position of the servo laser light in the direction of the correction target pit row. The magnitude of the jump pulse is changed according to the distance from the pit row that is the current tracking servo target to the correction target pit row. After the jump pulse is applied, the selector signal of the correction target pit row is selected to obtain the tracking error signal for the correction target pit row, thereby performing the tracking servo based on the tracking error signal.

In such a manner, even when the correction amount AD_OFS is equal to or more than the half of the limit track of the related art, it is possible to switch the tracking servo target pit row to the correction target pit row.

The method of performing the tracking servo on the correction target pit row when the calculated correction amount AD_OFS is equal to or more than the half of the limit track of the related art is not limited to the above-described method, and another method may be used, for example, the pit row that is the tracking servo target is sequentially changed to the adjacent pit row to reach the correction target pit row.

In any case, the correction of the spot position deviation is realized, and there is no change in that the tracking servo is performed on the specific correction target pit row from the calculated correction amount AD_OFS.

1-8. Overall Internal Configuration of Recording Device

Figure 12:
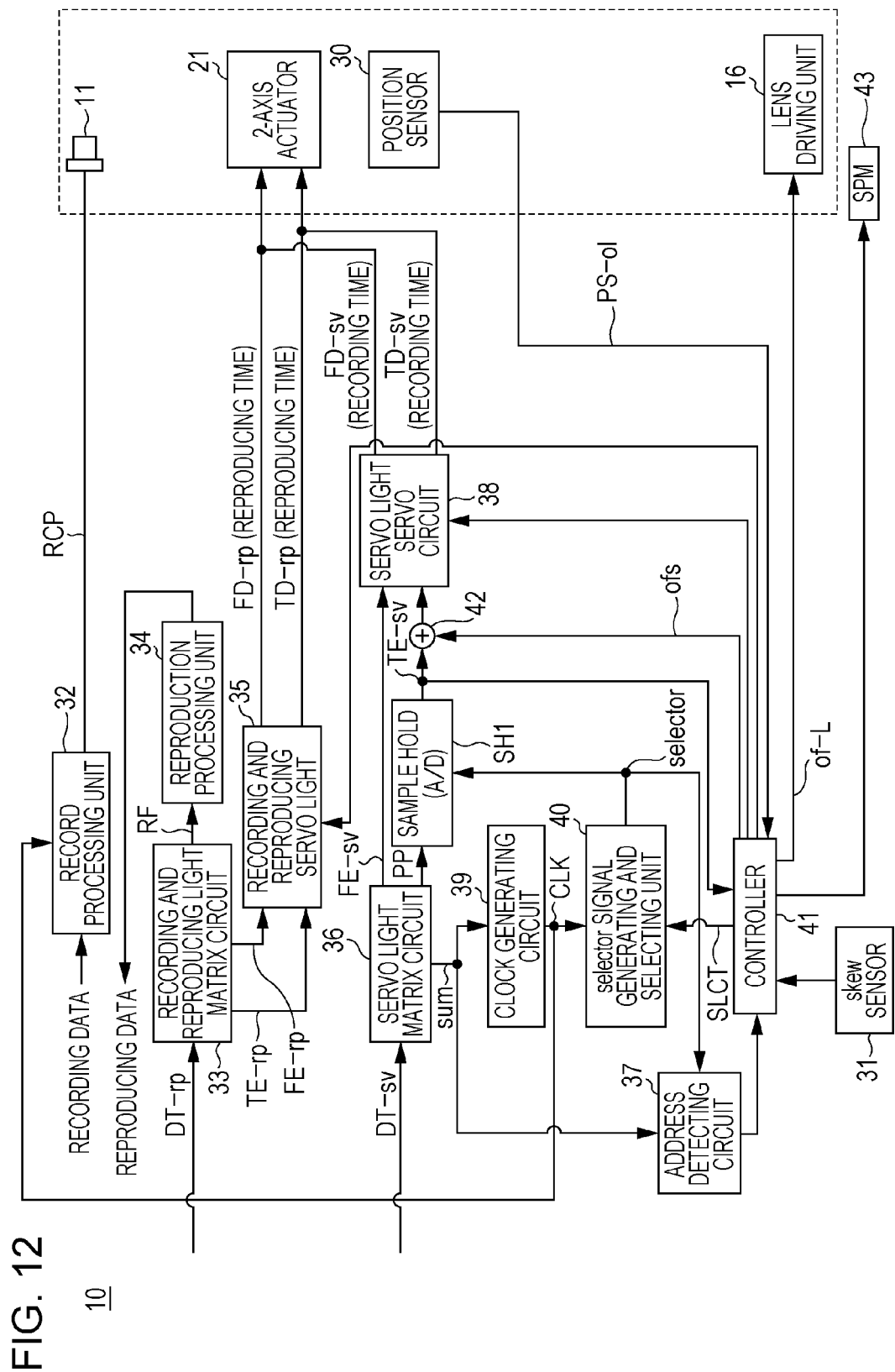
FIG. 12 is a block diagram illustrating an internal configuration of the whole of a recording device as the related example.

FIG. 12 shows an overall internal configuration of the recording and reproducing device 10 as the related example in which the correction of the spot position deviation is performed by the method described above.

In FIG. 12, the internal configuration of the optical pickup OP is shown by extracting only the recording and reproducing laser 11, the lens driving unit 16, the 2-axis actuator 21, and the position sensor 30 of the configuration shown in FIG. 2.

In FIG. 12, the recording and reproducing device 10 is provided with a spindle motor 43.

The spindle motor 43 is provided with a FG (Frequency Generator) motor, and rotates the bulk type recording medium 1 at a constant velocity (constant rotation velocity).

The spindle motor 43 starts or stops the rotation according to the instruction from the controller 41 to be described later.

The recording and reproducing device 10 is provided with a record processing unit 32, a recording and reproducing light matrix circuit 33, and a reproduction processing unit 34, as a configuration of a signal processing system for performing recording and reproducing on the bulk layer 5 or focus and tracking control (i.e., positional control based on the reflection light of the recording and reproducing laser light) of the object lens 20 at the time of reproducing the recording mark.

Data (recording data) to be recorded on the bulk type recording medium 1 is input to the record processing unit 32. The record processing unit 32 adds an error correction sign to the input recording data or performs a predetermined recording modulation encoding, to obtain a recording modulation data row that is a binary data row of, for example, "0" and "1" actually recorded on the bulk type recording medium 1.

The record processing unit 32 inputs a clock CLK (reproducing clock) generated by a clock generated circuit 39 as a recording clock and generates a recording pulse RCP according to the generated recording modulation data row on the basis of the recording clock. Light emitting driving of the recording and reproducing laser 11 in the optical pickup OP is performed by the recording pulse RCP.

The recording and reproducing matrix circuit 33 is provided with a current voltage conversion circuit and a matrix operation and amplification circuit corresponding to the light receiving signal DT-rp (output current) from the plurality of light receiving elements as the recording and reproducing light receiving unit 23 shown in FIG. 2, and generates a necessary signal by a matrix operation process.

Specifically, a high frequency signal (hereinafter, referred to as a reproducing signal RF) corresponding to the reproducing signal obtained by reproducing the recording modulation data row, a focus error signal FE-rp for the focus servo control, and a tracking error signal TE-rp for the tracking servo control are generated.

The reproducing signal RF generated in the recording and reproducing matrix circuit 33 is supplied to the reproduction processing unit 34.

The focus error signal FE-rp and the tracking error signal TE-rp are supplied to the recording and reproducing light servo circuit 35.

The reproduction processing unit 34 performs a reproduction process for recovering the recording data such as a binarization process or a decoding and error correction process of the recording modulation sign on the reproducing signal RF, to obtain the reproducing data of reproducing the recording data.

The recording and reproducing light servo circuit 35 generates a focus servo signal FS-rp and a tracking servo signal TS-rp on the basis of the focus error signal FE-rp and the tracking error signal TE-rp supplied from the matrix circuit 33, and drives a focus coil and a tracking coil of the 2-axis actuator 21 on the basis of a focus driving signal FD-rp and a tracking driving signal TD-rp based on the focus servo signal FS-rp and the tracking servo signal TS-rp, to perform the focus servo control and the tracking servo control on the recording and reproducing laser light.

As understood from the description, the servo control of the 2-axis actuator 21 (object lens 20) based on the reflection light of the recording and reproducing laser light is performed during reproduction.

The recording and reproducing light servo circuit 35 applies a jump pulse to the tracking coil with the tracking servo loop set as OFF to perform a track jump operation or to perform a drawing-in control of the tracking servo, according to the instruction from the controller 41 during reproduction. In addition, a focus servo drawing-in control or the like is performed.

The recording and reproducing device 10 is provided with a servo light matrix circuit 36, an address detecting circuit 37, a servo light servo circuit 38, a clock generating circuit 39, a selector signal generating and selecting unit 40, a sample hold circuit SH1, and an adder 42.

The servo light matrix circuit 36 generates a necessary signal on the basis of the light receiving signal DT-sv from the plurality of light receiving element in the servo light receiving unit 29 shown in FIG. 2.

Specifically, the servo light matrix circuit 36 in this case generates a push-pull signal PP, a sum signal, and a focus errors signal FE-sv for focus servo control.

As shown, the push-pull signal PP is supplied to the sample hold circuit SH1. The focus error signal FE-sv is supplied to the servo light servo circuit 38.

The sum signal is supplied to the address detecting circuit 37 and the clock generating circuit 39.

The address detecting circuit 37 detects address information (absolute positional information including at least radial positional information or rotation angle positional information) recorded on the reference face Ref by inputting the selector signal generated and selected by the selector signal generating and selecting unit 40 in a manner described below, on the basis of the result of sampling the value of the sum signal from the servo light matrix circuit 36 at the timing (in this case, at the section where the selector signal is a high level) of the pit formable position represented by the selector signal.

As described with reference to FIG. 7A, FIG. 7B, and FIG. 7C, in the case of the embodiment, in the address information of each pit row, it is recorded whether or not the pit is formed at the pit formable position in the pit row as information of one channel bit. The address detecting circuit 37 recognizes the value of the sum signal at the rising timing of the selector signal to recognize data of "0" or "1" of the one channel bit, and performs an address decoding process according to the format described with reference to FIG. 9 on the basis of the result to perform detection (reproduction) of the recorded address information.

The address information detected by the address detecting circuit 37 is supplied to the controller 41.

The clock generating circuit 39 generates the clock CLK according to the above-described sequence.

Figure 13:
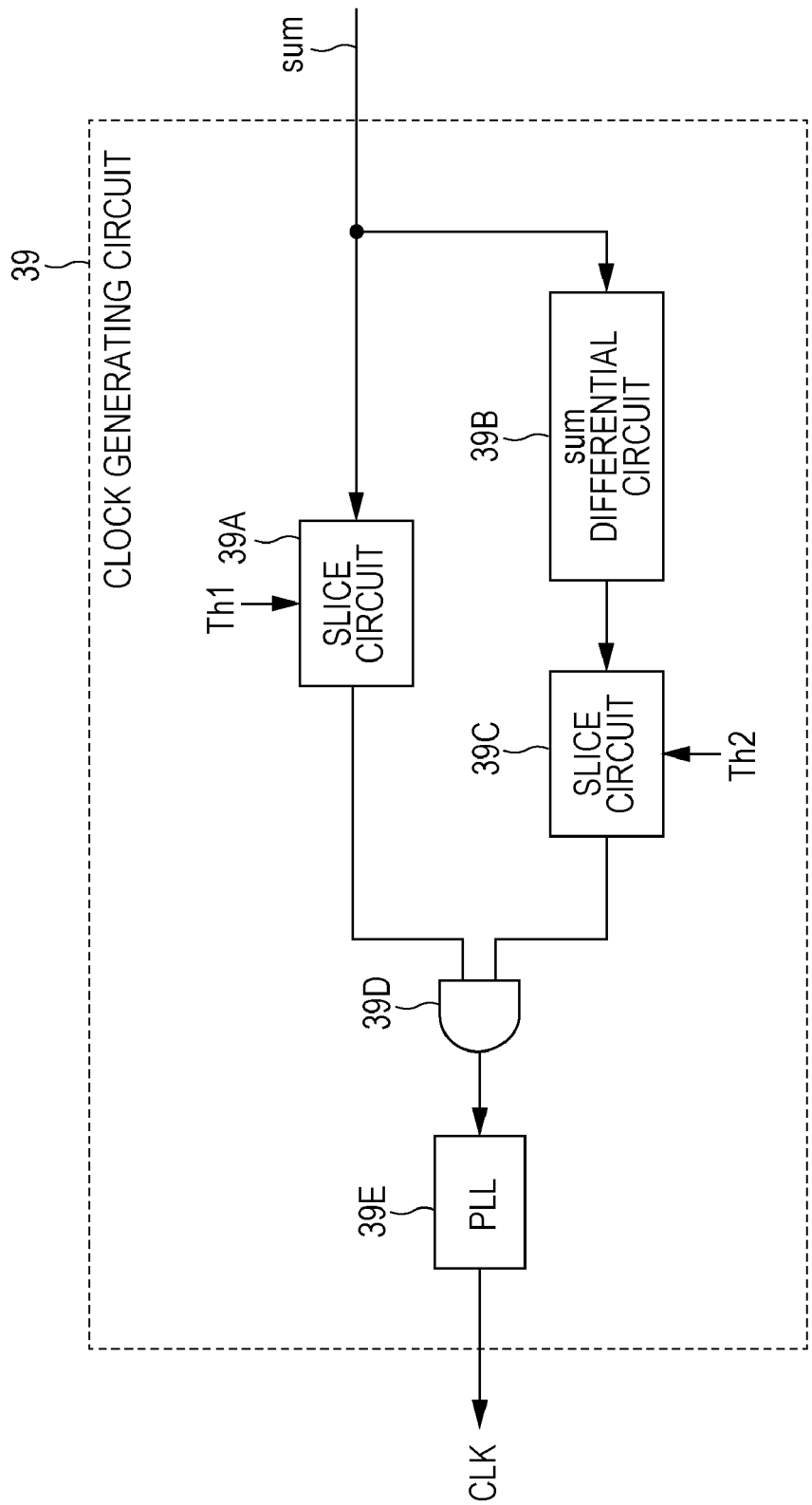
FIG. 13 is a diagram illustrating an internal configuration of a clock generating circuit.

FIG. 13 shows the internal configuration of the clock generating circuit 39.

In FIG. 13, the clock generating circuit 39 is provided therein with a slice circuit 39A, a sum differential circuit 39B, a slice circuit 39C, an AND gate circuit 39D, and a PLL circuit 39E.

The sum signal is input to the slice circuit 39A and the sum differential circuit 39A as shown. The slice circuit 39A slices the sum signal on the basis of the set threshold value Th1, and the result is output to the AND gate circuit 39D.

The sum differential circuit 39B differentiates the sum signal to generate the sum differential signal described above. The slice circuit 39C slices the sum differential signal generated by the sum differential circuit 39B on the basis of the set threshold value Th2, and outputs the result to the AND gate circuit 39D.

The AND gate circuit 39D takes the AND of the output from the slice circuit 39A and the output from the slice circuit 39C to generate the timing signal described above.

The PLL circuit 39E performs a PLL process using the timing signal obtainable by the AND gate circuit 39D as described above as an input signal, to generates the clock CLK.

Returning to FIG. 12, the clock CLK generated by the clock generating circuit 45 is supplied to the record processing unit 32 and is supplied to the selector signal generating and selecting unit 40.

The selector signal generating and selecting unit 40 generates the selector signals based on the clock CLK, and selectively outputs the instructed selector signal of the generated selector signals.

Figure 14:
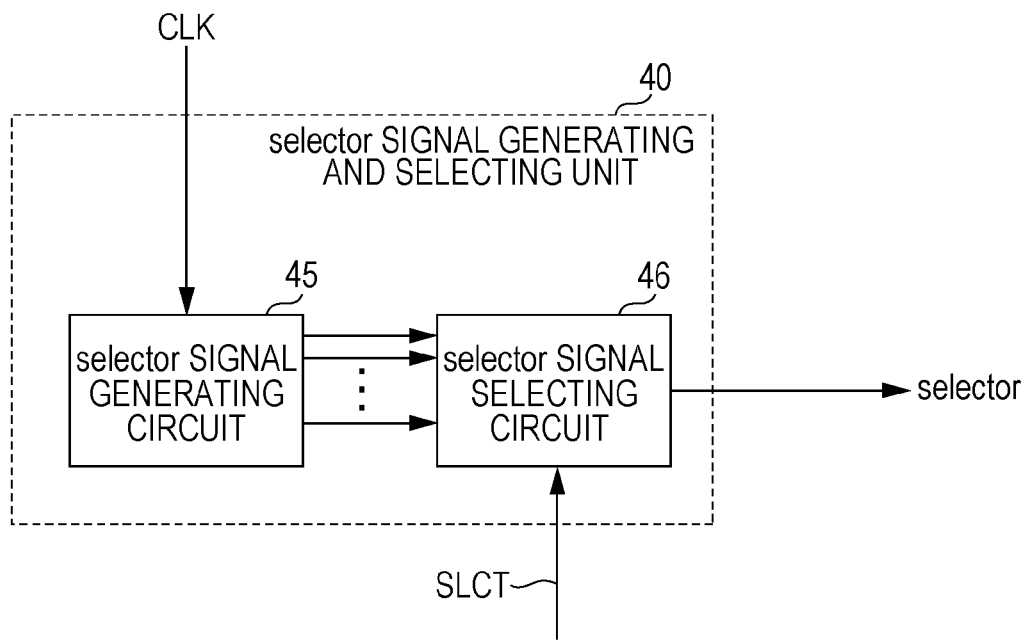
FIG. 14 is a diagram illustrating an internal configuration of a selector signal generation and selection unit.

FIG. 14 shows an internal configuration of the selector signal generating and selecting unit 40.

As shown, the selector signal generating and selecting unit 40 is provided with a selector signal generating circuit 45, and a selector signal selecting circuit 46.

The selector signal generating circuit 45 generates 6 kinds of selector signals representing the timing of the pit formable positions of the pit rows A to F on the basis of the clock CLK. Specifically, the selector signal generating circuit 45 respectively generates signals shifted in phase by ⅙ cycle as signals obtained by dividing the clock CLK by ⅙, thereby obtaining the 6 kinds of selector signal.

The 6 kinds of selector signals are supplied to the selector signal selecting circuit 46.

The selector signal selecting circuit 46 selectively outputs the selector signal with the phase instructed by the selection signal SLCT supplied from the controller 41 among the 6 kinds of input selector signals.

The description is returned to FIG. 12.

The selector signal output from the selector signal selecting circuit 46 is supplied to the address detecting circuit 37 and is supplied to the sample hold circuit SH1 as shown.

The sample hold circuit SH1 is provided with an A/D convertor, and sample-holds the push-pull signal PP supplied from the servo light matrix circuit 36 at the rising edge of the selector signal.

The tracking error signal obtainable by sample-holding the push-pull signal PP according to the selector signal by the sample hold circuit SH1 is hereinafter referred to as a tracking error signal TE-sv.

The tracking error signal TE-sv obtained by the sample hold circuit SH1 as shown is supplied to the servo light servo circuit 38 through the adder 42.

The tracking error signal TE-sv is supplied to the controller 41.

The servo light servo circuit 38 generates a focus servo signal FS-sv and a tracking servo signal TS-sv on the basis of the focus error signal FE-sv and the tracking error signal TE-sv passing through the adder 42.

During recording, the focus coil and the tracking coil of the 2-axis actuator 21 are driven on the basis of the focus driving signal FD-sv and the tracking driving signal TD-sv generated on the basis of the focus servo signal FS-sv and the tracking servo signal TS-sv according to the instruction from the controller 41, to perform the focus servo control on the servo laser light and the tracking servo control on the necessary pit rows.

The servo light servo circuit 38 performs a track jump operation (a jump operation between pit rows) by applying a jump pulse to the tracking coil of the 2-axis actuator 21 considering the tracking servo loop as OFF, according to the instruction from the controller 41 during recording.

The controller 41 is formed of a micro computer provided with, for example, a CPU (Central Processing Unit), and a memory (storage device) such as a ROM (Read Only Memory) and a RAM (Random Access Memory), and performs a control process based on programs stored in, for example, the ROM, to control the whole of the recording and reproducing device 10.

For example, the controller 41 performs control (setting) of the infocus position of the recording and reproducing laser light on the basis of the value of the offset of-L set corresponding to each layer position as described above. Specifically, the lens driving unit 16 in the optical pickup OP is driven on the basis of the value of the offset of-L set corresponding to the information recording layer position L that is the recording target to select the recording position in the depth direction.

The controller 41 also performs control for performing the servo control switching of the object lens 20 at the recording and reproducing time described above. Specifically, during recording, the controller 41 instructs the servo light servo circuit 38 to output the focus driving signal FD-sv and the tracking driving signal TD-sv, and instructs the recording and reproducing light servo circuit 35 to stop the outputting of the focus driving signal FD-rp and the tracking driving signal TD-rp.

During reproduction, the controller 41 instructs the recording and reproducing light servo circuit 35 to output the focus driving signal FD-rp and the tracking driving signal TD-rp, and instructs the servo light servo circuit 38 to stop the outputting of the focus driving signal FD-sv and the tracking driving signal TD-sv.

The controller 41 also performs seek operation control for the servo light servo circuit 38. That is, the controller 41 performs an instruction to the servo circuit 38 to move the spot position of the servo laser light to a predetermined target address on the reference face Ref, and a selective instruction of the selector signal based on the selection signal SLCT for the selector signal generating and selecting unit 40 (selector signal selecting circuit 46).

For example, the seek operation control in this case is performed substantially in the following sequence:

1) moving to the vicinity of the target address by movement of the whole of the optical pickup OP using the slide driving unit described above;

2) focusing servo ON of the servo laser light;

3) generating the clock CLK based on the sum signal and generating the selector signals;

4) performing the tracking servo control on an arbitrary pit row on the basis of the arbitrarily selected selector signal; and 5) performing the pit row jump from the address to the target address since the address information (information for recognizing the pit row) can be read by performing the tracking servo in the above 4).

The controller 41 performs an instruction with regard to the servo circuit 38 to perform the operations of 1) and 2). The controller 41 performs the selection instruction of the selector signal based on the predetermined phase on the selector signal generating and selecting unit 40 by the selection signal SLCT to select the arbitrary selector signal in the above 4).

The controller 41 inputs the address information detected by the address detecting circuit 37 according to the tracking servo based on the above 4) to perform the operation of 5), calculates the number of jumps of the pit row necessary for the target address on the basis of the address information, and performs an instruction to perform the pit row jump operation on the servo circuit 38 by the number of jumps.

The controller 41 performs the following process as a control process relating to the spot position deviation correction described above.

That is, the controller 41 sequentially acquires the value of the skew detection signal of the skew sensor 31 and the value of the position detection signal ps-ol of the position sensor 30, and performs the calculation of Formula 1 to Formula 3 using the value of the skew detection signal sk, the value of the position detection signal ps-ol, and the correction coefficient offset_SK, gain_SK, offset_SH, gain_SH, and D_alm, to sequentially calculate the correction amount AD_OFS.

The correction target pit row to be selected to perform the correction of the correction amount AD_OFS on the basis of the result of dividing the value of the calculated correction amount AD_OFS by the value the pit row formation pitch is specified, and the value of the offset ofs to be applied to the tracking error signal TE-sv is acquired.

The selection of the selector signal representing the timing of the pit formable position of the specified correction target pit row is instructed to the selector signal generating and selecting unit 40 by the selection signal SLCT, and the value of the acquired offset ofs is output to the adder 42 to apply the offset ofs to the tracking error signal TE-sv.

As described above, when the calculated correction amount AD_OFS is equal to or more than the half of the limit tract of the related art, the jump pulse is applied to the servo light servo circuit 38 in the direction of forming the correction pit row.

The controller 41 also performs a process for correcting the error of the address information generated according to that the spot position of the servo laser light is offset from the pit row to be the original target by the spot position deviation correction operation. Specifically, while performing the spot position deviation correction operation, the address information obtainable in the address detection circuit 37 is corrected according to the offset amount (the number of pit rows from the track to record to the pit row that is actually the servo target) of the servo laser light spot position.

2. Embodiment

2-1. Problem of Related Example

In the related example as described above, when the correction of the deviation of the information recording position as described in FIG. 3A, FIG. 3B, FIG. 4A, and FIG. 4B is performed by offsetting the tracking servo target position from the original position, the pit rows based on the format shown in FIG. 6 (and FIG. 5) is formed on the reference face Ref to perform the correction with higher precision.

As described above, in the case of the format shown in FIG. 6, the pit row is recorded by the CAV method to keep the phase relationship of the pit rows A to F described in FIG. 5 in any area on the disc.

The pit rows are recorded by the CAV on the reference face Ref as described, to rotate the bulk type recording medium 1 at a constant velocity at the time of recording on the bulk layer 5 in the related example. That is, in the related example, the mark recording on the bulk layer 5 is performed by the CAV method.

Figure 15:
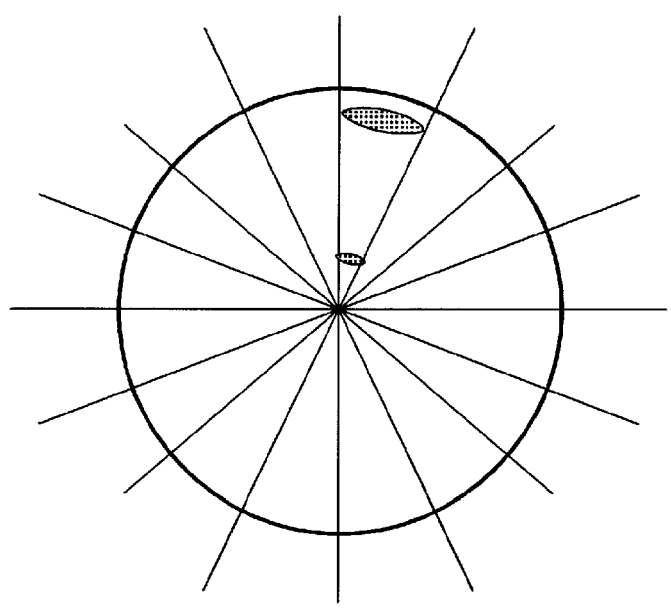
FIG. 15 is a diagram illustrating a problem of the related example.

However, as described above, in the CAV recording, the mark recording density tends to decrease as compared with the CLV recording. Specifically, as shown in FIG. 15, since the recording mark length tends to extend to the outer circumferential side, the mark recording density decreases to that extent.

As described above, it is difficult to avoid the decrease of the recording capacity of the bulk layer 5.

2-2. Configuration of Recording Device as Embodiment

Figure 16:
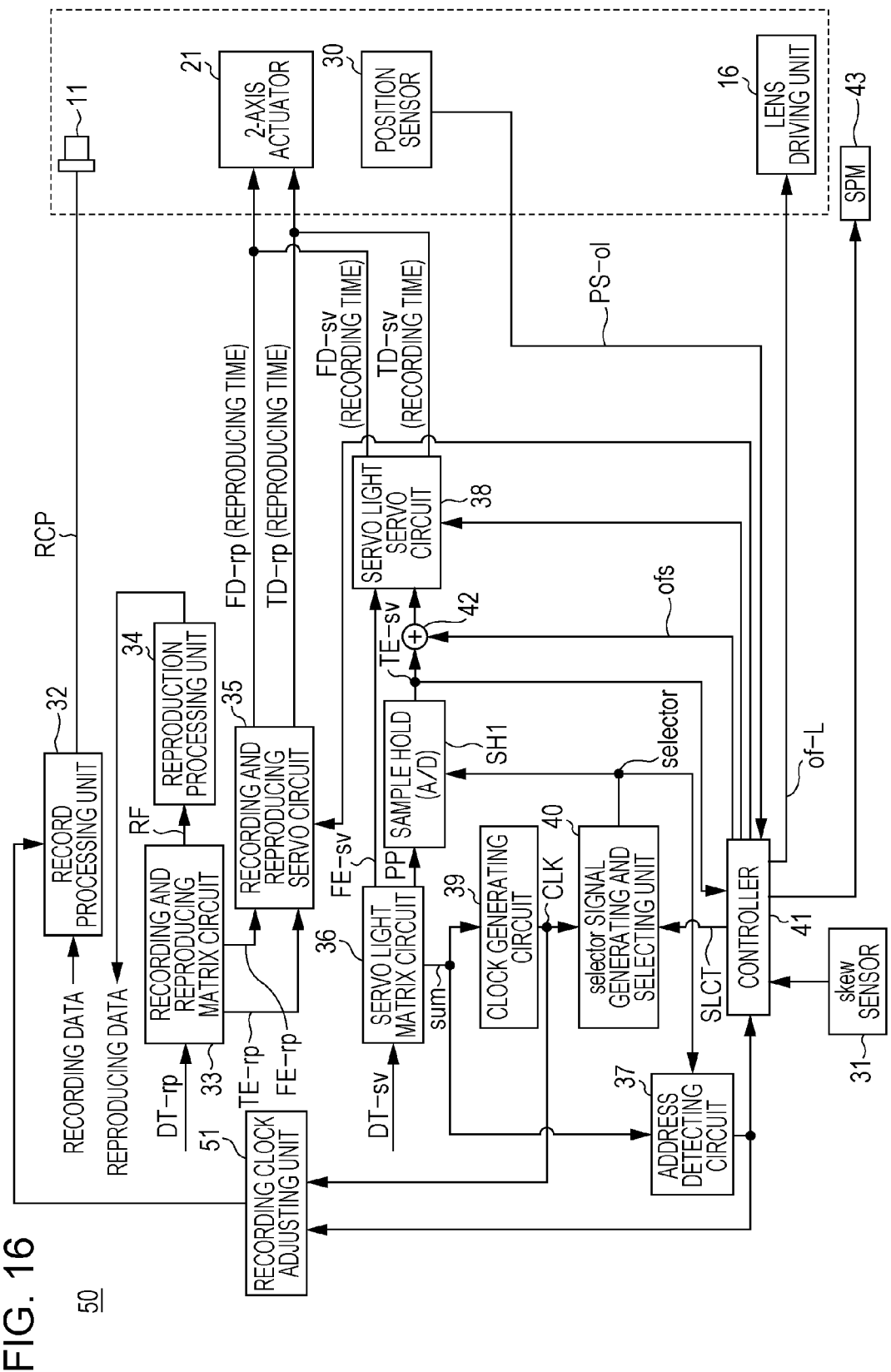
FIG. 16 is a block diagram illustrating an internal configuration of the whole of a recording device as the embodiment.

In the embodiment, a recording and reproducing device 50 shown in FIG. 16 obtained by improving the recording and reproducing device 10 is proposed to solve the above-described problem.

In FIG. 16, the same reference numerals and signs are given to the portions which have been already described in FIG. 12, and the description thereof is omitted.

As can be understood by comparing FIG. 16 with FIG. 12, the recording and reproducing device 50 of the embodiment is additionally provided with a recording clock adjusting unit 51 in the drawing, as compared with the recording and reproducing device 10 as the related example.

The address information (including the radial positional information) detected by the address detecting circuit 37 and the clock CLK generated in the clock generating circuit 39 are input to the recording clock adjusting unit 51.

The recording clock adjusting unit 51 changes the frequency of the clock CLK on the basis of the radial positional information input as the address information. The signal obtained by changing the frequency of the clock CLK on the basis of the radial positional information is output to the record processing unit 32 as the recording clock.

Specifically, the recording clock adjusting unit 51 changes the frequency of the clock CLK to be high as the current radial position specified from the radial positional information gets closer to the outer circumferential side.

More specifically, when the frequency of the recording clock is $f_r$, the frequency of the clock CLK is $f_0$, the inmost circumferential radial position is $r_0$, and the current radial position is $r$, the recording clock is generated by changing the frequency of the clock CLK by $$f_r = f_0 \times r / r_0 \qquad \text{Formula 4.}$$

Figure 17:
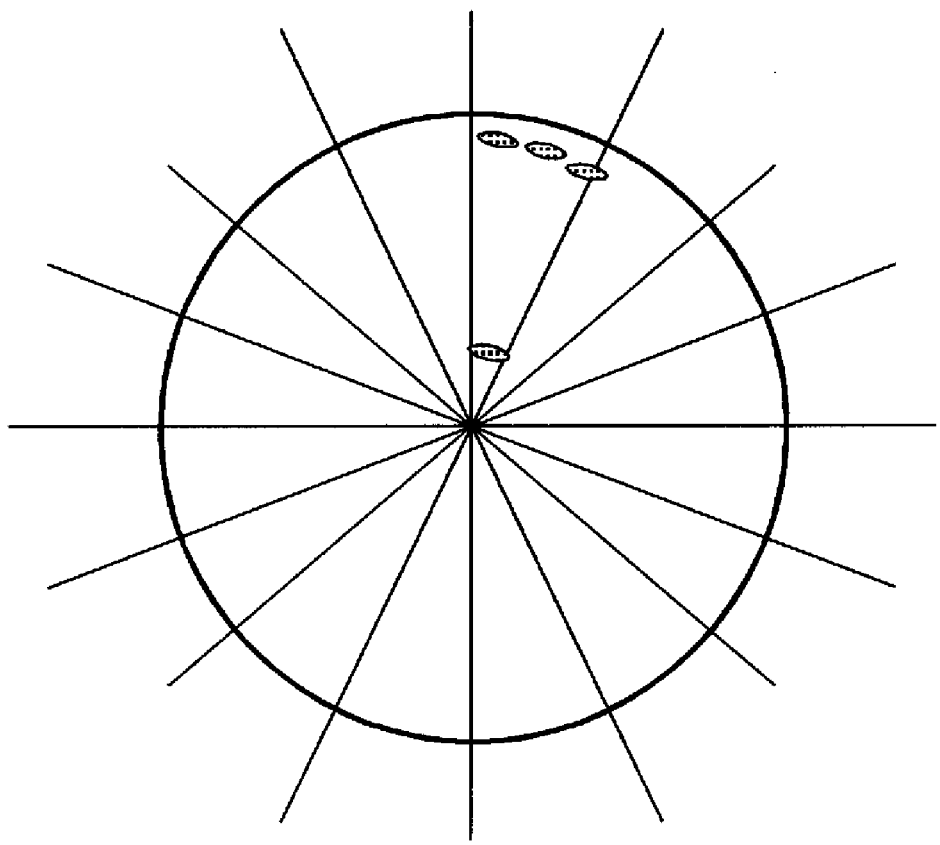
FIG. 17 is a diagram illustrating an effect of the recording method as the embodiment.

The mark recording operation is performed by the record processing unit 32 according to the recording clock generated by Formula 4, and the bulk layer 5 comes to be as if the mark row is recorded by CLV. In other words, as shown in FIG. 17, the mark recording density can be kept regular at any position on the disc.

According to the recording and reproducing device 50 of the embodiment as described above, when the bulk type recording medium 1 is rotated at the constant velocity according to the information recording on the reference face Ref by the CAV method, it is possible to record the mark in the bulk layer 5 with the regular recording density. As a result, it is possible to raise the recording density of the mark in the bulk layer 5 higher than the case of performing CAV recording.

Since it is possible to raise the recording density of the mark, it is possible to increase the recording capacity of the bulk layer 5.

3. Modified Example

The embodiment of the present disclosure has been described above, but the present disclosure is not limited to the specific example described hitherto.

In the description of the example, the clock frequency is continuously changed according to the radial position, but the bulk type recording medium 1 may be divided into a plurality of radial areas and the frequency may be changed stepwise for each radial area.

In any case, when the clock frequency is changed according to the radial position, it is possible to improve the mark recording density and thus it is possible to increase the recording capacity, as compared with the case of merely performing CAV recording on the bulk layer 5 (i.e., recording is performed using the signal of the regular frequency such as the clock CLK as the recording clock).

In the description, the bulk type recording medium 1 is rotated at the constant velocity by the FG motor, but the rotation may be performed at a constant velocity by performing rotation velocity control based on the clock CLK (reproducing clock).

Figure 18:
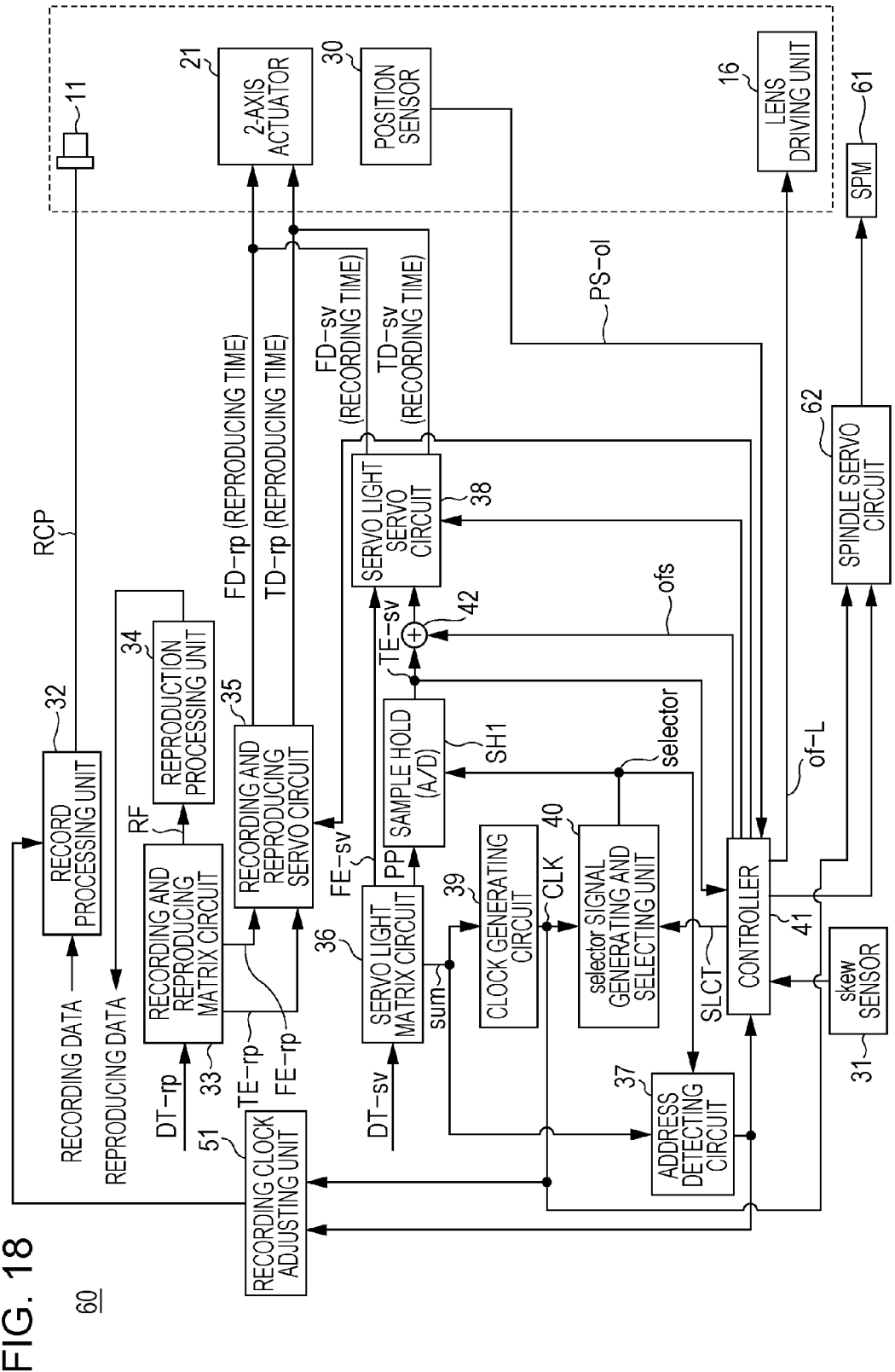
FIG. 18 is a diagram illustrating a configuration of a recording device as a modified example.

FIG. 18 shows an internal configuration of a recording and reproducing device 60 as a modified example performing the rotation at the constant velocity on the basis of the clock CLK as described above. In FIG. 18, the same reference numerals and signs are given to the portions which have been already described in FIG. 12 or FIG. 16, and the description thereof is omitted.

As can be understood by comparing FIG. 18 with FIG. 16, in the recording and reproducing device 60 as the modified example, a spindle servo circuit 62 is added to the recording and reproducing device 50, and a variable velocity type spindle motor 61 is provided instead of the spindle motor 43 formed of the FG motor.

The spindle servo circuit 62 controls the rotation velocity of the spindle motor 61 such that the frequency of the clock CLK is regular by inputting the clock CLK from the clock generating circuit 39 as current disc rotation velocity information, thereby rotating the bulk type recording medium 1 at the constant velocity.

In this case, the controller 41 instructs the spindle servo circuit 62 to stop or start rotating or to kick or brake, and the spindle servo circuit 62 controls the rotation of the spindle motor 61 according to such an instruction.

In the description, the recording clock is generated by changing the clock CLK generated on the basis of the reflection light from the reference face Ref according to the radial position, but the recording clock may be generated by changing a signal based on a regular frequency generated by a separately provided signal generator according to the radial position.

Figure 19:
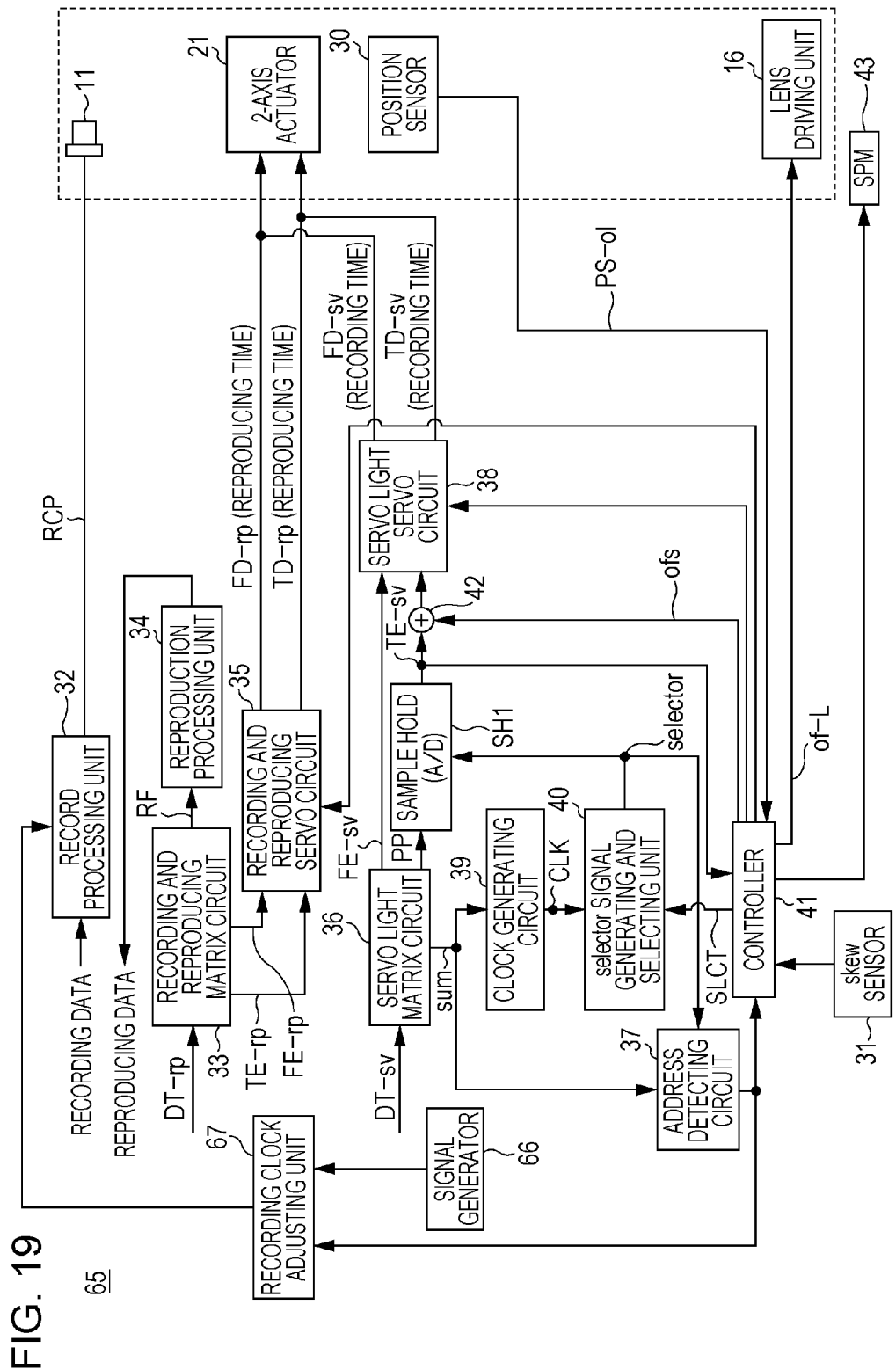
FIG. 19 is a diagram illustrating a configuration of a recording device as another modified example.

FIG. 19 shows an internal configuration of a recording and reproducing device 65 as a modified example (another modified example) generating the recording clock as described above. In FIG. 19, the same reference numerals and signs are given to the portions which have been already described in FIG. 12 or FIG. 16, and the description thereof is omitted.

As can be understood by comparing FIG. 19 with FIG. 16, in the recording and reproducing device 65 as the modified example, a signal generator 66 is added to the recording and reproducing device 50, and a recording clock adjusting unit 67 is provided instead of the recording clock adjusting unit 51.

The signal generator 66 generates a signal based on a regular frequency. The recording clock adjusting unit 67 changes the frequency according to the radial position with respect to the signal of the regular frequency generated by the signal generator 66 to give the recording clock to the record processing unit 32.

As the method of generating the recording clock in the present disclosure as described above, the frequency of the reference signal generated to be the regular frequency, such as the signal based on the regular frequency generated by the signal generator 66 or the clock CLK (reproducing clock) in the embodiment may be changed according to the radial position, and thus it is possible to improve the mark recording density in the recording layer.

In the description, the case of forming the pit rows of the reference face Ref in the spiral shape is exemplified, but the pit rows may be formed in a concentric shape.

When the pit rows are recorded in the concentric shape, the mark recording on the bulk layer 5 is performed to obtain an appropriate radial direction pitch.

For example, when the proper formation pitch in the radial direction of the mark row is the limit track pitch (6 pit rows) of the related art, there is a method of performing the recording of the mark row while sequentially jumping 6 pit rows after the recording of one cycle pit row is completed. That is, the mark row recording is performed in order of one cycle recording of any pit row, jumping of 6 pit rows, one cycle recording of jump target pit row, jumping of 6 pit rows, and . . . , in other words, close to the concentric shape.

Even in the case of the concentric shape, the spiral recording can be realized by gradually jumping the pit rows. Specifically, the spiral recording is performed as follows.

First, in the realizing of the spiral recording, the tracking error signal TE-sv for the pit row adjacent to the outer circumferential side of the pit row of the servo target is obtained together during the performing of the tracking servo on any pit row. In this case, at least two configurations of sampling the sum signal at the timing according to the selector signal to obtain the tracking error signal TE-sv are provided, and the output on any one side may be selectively output to the adder 41.

In addition, the offset, the value of which gradually gets larger, is applied into the servo loop during the performing of the tracking servo on any pit row. The spot position is gradually shifted to the outer circumferential side by applying such an offset.

The spot position reaches an appropriate position (e.g., the intermediate position) between the target pit row and the pit row adjacent to the outer circumferential side by applying the offset, the servo target pit row is switched to the pit row adjacent to the outer circumferential side, and the polarity of the offset applied into the servo loop is reversed.

After the polarity reversing of the offset, the value of the offset becomes gradually larger (becomes gradually smaller as an absolute value), and the spot position gradually becomes closer to the target pit row after switching (since the spot position is at the position deviating to the inner circumferential side as viewed from the pit row after switching). Thereafter, when the offset is continuously applied, the spot position passes through the target pit row after switching (at this time, the offset is zero), and then reaches the proper position between the pit row and the pit row further adjacent to the outer circumferential side. As described above, the spot position reaches the proper position between the pit row and the pit row adjacent to the outer circumferential side, the pit row that is the servo target as described above is switched to the pit row adjacent to the outer circumferential side, and the polarity of the offset is reversed.

As described above, so-called "pit row jumping" based on the applying of the offset and the switching of the servo target pit row to the pit row adjacent to the outer circumferential side is repeated to realize the spiral recording of any pitch based on the inclination (an increasing rate of the value thereof) of the offset.

In the description, a total of 6 pit rows A to F are set as the plurality of pit rows having different pit row phases and the pit rows based on the 6 patterns (pit row phases) are repeatedly formed in the radial direction, but the number of the pit rows is not limited to 6, and may be a more number and a less number of pit rows.

The case where the section length of each pit formable position in the pit rows is the section length of 3T and the interval between the edges of the pit formable positions in the pit formation direction is set to the length of 3T (i.e., n=6T) is exemplified, but they are merely an example. The section length of each pit formable position and the interval between edges of the pit formable positions in the pit row formation direction may be set to satisfy the conditions of 1) and 2) described above.

In the description, in the plurality of pit rows having different pit row phases, the pit rows are arranged such that the pit row phase proceeds as much as the outer circumferential side and the pit row phase is deviated as much as the inner circumferential side. However, the arrangement pattern of the plurality of pit rows may be set to various patterns under the condition in which it does not exceed the optical limit in the pit row formation direction, for example, the pit row phase proceeds as much as the inner circumferential side and the pit row phase is deviated as much as the outer circumferential side.

The position guide on the reference face is formed by the pits, but the position guide on the reference face may be formed by the recording of the mark.

The format of the information recording on the reference face is not limited to the format shown in FIG. 5 or FIG. 6, and the information recording on the reference face of the present disclosure including at least radial positional information may be performed by the CAV method.

For example, when the format shown in FIG. 5 or FIG. 6 is not employed, the radial positional information may be recorded by wobbling grooves. The present disclosure may be very appropriately applied to the case of recording the radial positional information on the reference face by the wobbling grooves.

Figure 20:
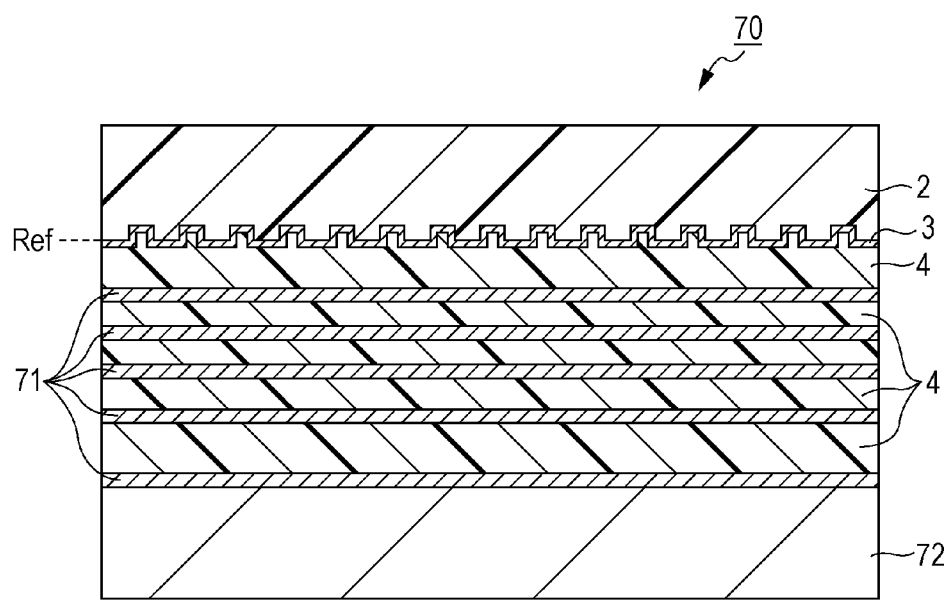
FIG. 20 is a diagram illustrating a cross-sectional structure of an optical recording medium as a modified example.
Figure 21:
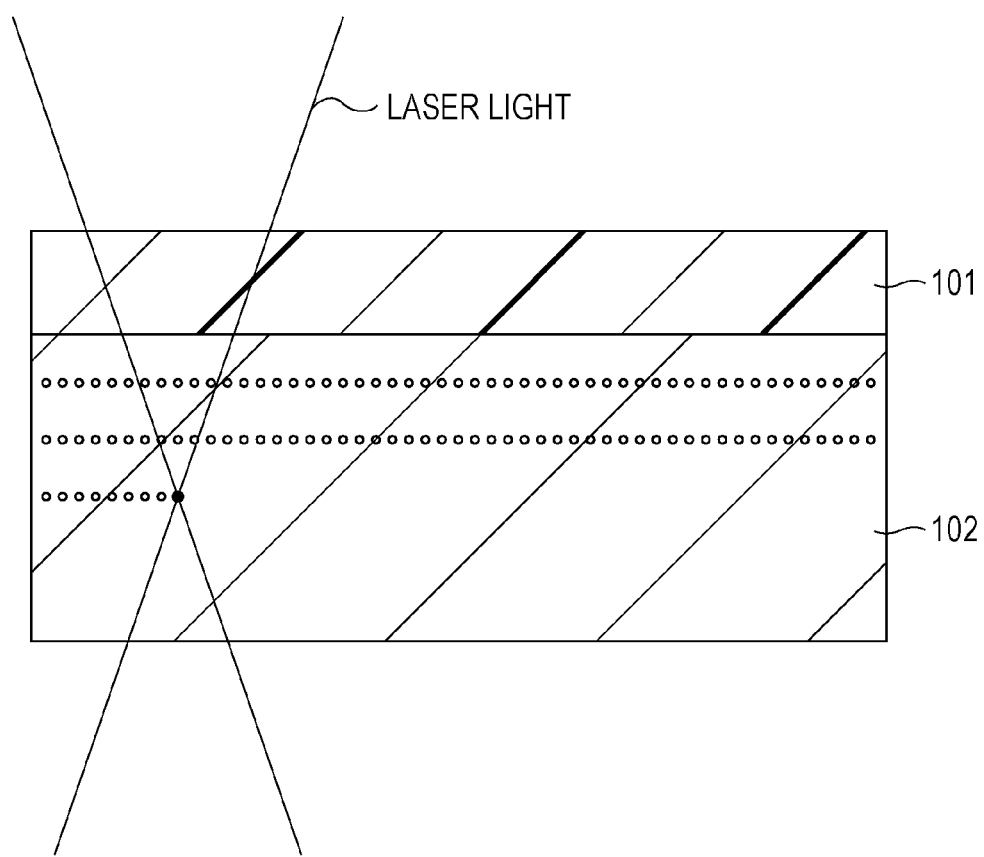
FIG. 21 is a diagram illustrating a bulk recording method.
Figure 22:
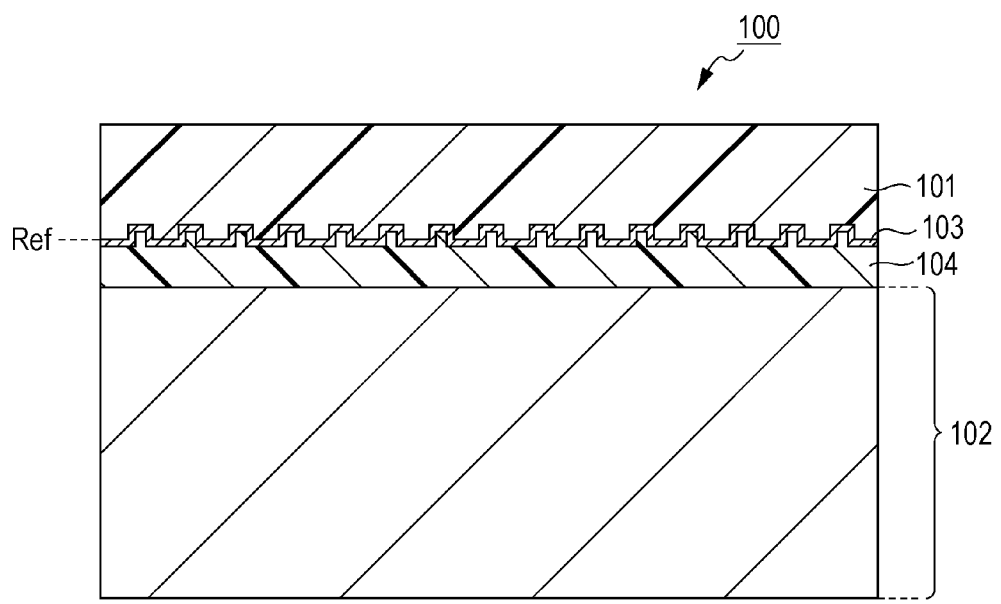
FIG. 22 is a diagram illustrating an example of a cross-sectional structure of an actual bulk type recording medium having a reference face.

In the description, the case where the optical recording medium that is the recording target of the present disclosure is the bulk type optical recording medium is exemplified, but the present disclosure may be very appropriately applied to, for example, an optical recording medium (a multilayer recording medium 70) provided with a recording layer having a multilayer structure provided with a plurality of recording films as shown in FIG. 20 instead of the bulk layer 5.

In FIG. 20, the multilayer recording medium 70 is the same as the bulk type recording medium 1 shown in FIG. 1 in that the cover layer 2, the selective reflection film 3, and the intermediate layer 4 is formed in order from the upper layer side, but in this case, a recording layer having a layer structure in which semi-transparent recording films 71 and intermediate layers 4 are repeatedly laminated a predetermined number of times is laminated, instead of the bulk layer 5. As shown, the semi-transparent recording film 71 formed on the lowest layer is laminated on a substrate 72. A total-reflection recording film may be used as the recording film formed on the lowest layer.

Cautiously, the semi-transparent recording film 71 has to be provided with no position guide formed of pit rows or grooves. That is, even in the case of the multilayer recording medium 70, the spiral or concentric position guide is formed only at one layer position as the reference face Ref.

In the recording layer of the multilayer recording medium 70, since the semi-transparent recording film 71 serving as a reflection film is formed, it is possible to perform the focus control using the reflection light of the recording and reproducing laser light even during recording.

That is, during recording in this case, the focus servo control for the recording and reproducing laser light is performed to be focused on the semi-transparent recording film 71 that is the recording target by driving the movable lens 15 (the lens driving unit 16) on the basis of the reflection light of the recording and reproducing laser light.

Meanwhile, the tracking servo control of the recording and reproducing laser light during recording is performed using the servo laser light even in this case. That is, even during recording in this case, the tracking servo control is performed such that the object lens 20 is driven on the basis of the reflection light from the reference face Ref of the servo laser light, and the infocus position of the servo laser light is traced to the position guide of the reference face Ref.

Even in this case, it is possible to perform the tracking servo control of the recording and reproducing laser light on the basis of the mark row which has already been recorded during reproduction. As understood from the description, during reproduction, the focus servo control of the recording and reproducing laser light may be performed using the reflection light from a semi-transparent recording film 71 (information recording layer L) that is the target.

In this case, the servo control during reproduction is performed in the same method as the case of the embodiment. That is, the focus servo control of the recording and reproducing laser light during reproduction is performed by driving the object lens 20 to be focused onto the information recording layer L that is the target of the recording and reproducing light servo light on the basis of the reflection light of the recording and reproducing laser light, and the tracking servo control of the recording and reproducing laser light is performed by driving the object lens 20 such that the infocus position of the recording and reproducing servo light traces the mark row for which recording is completed, on the basis of the reflection light of the recording and reproducing laser light.

In the description, the reference face is provided on the upper layer side of the recording layer, but the reference face may be provided on the lower layer side of the recording layer.

In the present disclosure, the optical recording medium may have the reference face on which the recording of the information including the radial positional information is performed by the CAV method, and a recording layer formed at a depth position different from that of the reference face.

In the description, light with different wavelengths is used as the servo laser light and the recording and reproducing laser light, but they may have the same wavelength. In this case, the reflection light may be split and led by another light receiving unit, for example, by performing beam splitting using polarization of light, with being split through the dichroic prism 19.

When the recording and reproducing laser light and the servo laser light have the same wavelength as described above, it is satisfactory to provide only one light source.

In the description, the case of applying the present disclosure to the recording and reproducing device performing both of recording and reproducing on the optical recording medium is exemplified, the present disclosure may be also very appropriately applied to a recording-only device (a recording device) capable of only recording on the optical recording medium (recording layer).

The present disclosure contains subject matter related to that disclosed in Japanese Priority Patent Application JP 2010-132743 filed in the Japan Patent Office on Jun. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
 a rotation driving unit that rotates an optical recording medium having a reference face on which information including radial positional information is recorded by a CAV method (Constant Angular Velocity) and a recording layer formed at a depth position different from the reference face, at a constant velocity;
 a light irradiating unit that irradiates the optical recording medium with first light to be irradiated onto the recording layer and second light to be irradiated onto the reference face through a common object lens, wherein a wavelength of the first light is different from a wavelength of the second light;

an infocus position adjusting unit that performs adjustment to focus the first light at a necessary position in the recording layer with the second light infocused on the reference face;

a light receiving unit that receives reflection light of the second light from the reference face;

a reproducing clock generating unit that generates a reproducing clock on the basis of a light reception signal obtained by the light receiving unit;

a radial position detecting unit that detects the radial positional information recorded on the reference face on the basis of the light reception signal obtained by the light receiving unit and the reproducing clock positional information;

a frequency adjusting unit that changes a frequency of an input reference signal according to the radial positional information detected by the radial position detecting unit; and a recording unit that performs mark recording on the recording layer by driving a light source of the first light to emit light using the signal obtained by the frequency adjusting unit as a recording clock.

2. The recording device according to claim 1, wherein the frequency adjusting unit changes the frequency of the reference signal to be high as the radial position indicated by the radial positional information is an outer circumferential side.

3. The recording device according to claim 1, wherein the frequency adjusting unit changes the frequency of the reproducing clock according to the radial positional information by inputting the reproducing clock as the reference signal.

4. The recording device according to claim 1, wherein the rotation driving unit rotates the recording medium at a constant velocity on the basis of the reproducing clock generated by the reproducing clock generating unit.

5. The recording device according to claim 1, wherein the recording layer is a bulk layer and a plurality of layer positions is set in advance in the bulk layer, and a control unit that controls the infocus position adjusting unit to focus the first light at one necessary layer position in the bulk layer is provided.

6. The recording device according to claim 1, wherein the recording layer is a recording layer having a multilayer structure in which a plurality of recording films are formed at a plurality of positions in a depth direction, and a control unit that controls the infocus position adjusting unit to focus the first light at one necessary recording layer in the recording layer is provided.

7. The recording device according to claim 5, wherein on the reference face, pit rows in which intervals of a pit formable position in one cycle limited to a first interval are formed a spiral shape or a concentric shape, intervals of the pit formable positions in the pit row formation direction on the pit rows arranged in the radial direction are set to positions deviating by a predetermined second interval to have a plurality of pit row phases, and the radial positional information is recorded on each of the pit rows by a pattern of forming or non-forming of the pits at the pit formable position on the individual pit rows, and wherein the radial position detecting unit includes a timing selection signal generating unit that generates a plurality of timing selection signals representing the timings of pit formable positions for each plurality of pit rows, respectively representing the timings of the pit formable position, having different pit row phases formed on the reference face on the basis of the reproducing clock generated by the reproducing clock generating unit, a timing selection signal selecting unit that selects an instructed timing selection signal from the plurality of timing selection signals generated by the timing selection signal generating unit, and an information detecting unit that determines a channel data value of the reproducing signal obtained on the basis of the light reception signal at the timing of the pit formable position represented by the timing selection signal selected by the timing selection signal selecting unit, and detects the radial positional information on the basis of the result.

8. A recording method comprising:

rotating an optical recording medium having a reference face on which information including radial positional information is recorded by a CAV method (Constant Angular Velocity) and a recording layer formed at a depth position different from the reference face, at a constant velocity;

irradiating the optical recording medium with first light to be irradiated onto the recording layer and second light to be irradiated onto the reference face through a common object lens, wherein a wavelength of the first light is different from a wavelength of the second light;

performing adjustment to infocus the first light at a necessary position in the recording layer with the second light focused on the reference face;

receiving reflection light of the second light from the reference face;

generating a reproducing clock on the basis of a light reception signal obtainable by the light reception;

detecting the radial positional information recorded on the reference face on the basis of the light reception signal obtained by the light reception and the reproducing clock;

changing a frequency of an input reference signal according to the radial positional information detected by the radial position detection; and performing mark recording on the recording layer by driving a light source of the first light to emit light using the signal obtainable by the frequency adjusting as a recording clock.

9. The method of claim 8, wherein changing the frequency of the input reference signal comprises increasing the frequency of the reference signal as the radial position indicated by the radial positional information is an outer circumferential side.

10. The method of claim 8, further comprising:

changing the frequency of the reproducing clock according to the radial positional information by inputting the reproducing clock as the reference signal.

11. The method of claim 8, wherein rotating the optical recording medium at a constant velocity is based on the reproducing clock.

12. The method of claim 8, wherein:

the recording layer is a bulk layer and a plurality of layer positions is set in advance in the bulk layer.

13. The method of claim 8, wherein the recording layer is a recording layer having a multilayer structure in which a plurality of recording films are formed at a plurality of positions in a depth direction.

14. The method of claim 8, wherein:

on the reference face, pit rows in which intervals of a pit formable position in one cycle limited to a first interval are formed a spiral shape or a concentric shape, intervals of the pit formable positions in the pit row formation direction on the pit rows arranged in the radial direction are set to positions deviating by a predetermined second interval to have a plurality of pit row phases, and the radial positional information is recorded on each of the pit rows by a pattern of forming or non-forming of the pits at the pit formable position on the individual pit rows; and detecting the radial position information is based on:
- generating a plurality of timing selection signals representing the timings of pit formable positions for each plurality of pit rows, respectively representing the timings of the pit formable position, having different pit row phases formed on the reference face on the basis of the reproducing clock;
- selecting an instructed timing selection signal from the plurality of timing selection signals; and
- determining a channel data value of the reproducing signal obtained on the basis of the light reception signal at the timing of the pit formable position represented by the timing selection signal.

15. The method of claim 8, further comprising:
detecting a skew of the optical recording medium; and
changing the frequency of the input reference signal according to the detected skew of the optical recording medium.

16. The method of claim 15, wherein detecting the skew of the optical recording medium comprises:
- irradiating the optical recording medium with a third light at a predetermined angle; and
- detecting an amount of deviation of the third light reflected from the optical recording medium.

17. The recording device of claim 1, further comprising:
- a skew detecting unit that detects a skew of the optical recording medium;
- wherein the frequency adjusting unit changes the frequency of the input reference signal according to the detected skew of the optical recording medium.

18. The recording device of claim 17, wherein the skew detecting unit comprises:
- a skew light irradiation unit that irradiates the optical recording medium with a third light at a predetermined angle; and
- a skew light detection unit irradiation unit that detects art amount of deviation of the third light reflected from the optical recording medium.

* * * * *